US012701319B2

(12) United States Patent
Xu

(10) Patent No.: US 12,701,319 B2
(45) Date of Patent: Aug. 4, 2026

(54) METHOD FOR CAPTURING IMAGE IN VIDEO RECORDING AND ELECTRONIC DEVICE

(71) Applicant: HONOR DEVICE CO., LTD., Shenzhen (CN)

(72) Inventor: Jirun Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/721,750

(22) PCT Filed: Aug. 15, 2023

(86) PCT No.: PCT/CN2023/113138
§ 371 (c)(1),
(2) Date: Jun. 19, 2024

(87) PCT Pub. No.: WO2024/055797
PCT Pub. Date: Mar. 21, 2024

(65) Prior Publication Data
US 2025/0088732 A1     Mar. 13, 2025

(30) Foreign Application Priority Data
Sep. 14, 2022    (CN) .......................... 202211116174.5

(51) Int. Cl.
*H04N 23/63*          (2023.01)
*H04M 1/72439*     (2021.01)
(Continued)

(52) U.S. Cl.
CPC ........... *H04N 23/632* (2023.01); *H04N 5/772* (2013.01)

(58) Field of Classification Search
None
See application file for complete search history.

(56) References Cited

U.S. PATENT DOCUMENTS 8,520,970 B2     8/2013   Strandemar
9,769,403 B2     9/2017   Iwasaki et al.
(Continued)

FOREIGN PATENT DOCUMENTS

CN          103685933 A        3/2014
CN          105635614 A        6/2016
(Continued)

OTHER PUBLICATIONS

Zeng, et al: "One color contrast enhanced infrared and visible image fusion method", Infrared and Laser Engineering, 2015 ,44 (04), Apr. 25, 2015, 5 pages.

*Primary Examiner* — Hung Q Dang
(74) *Attorney, Agent, or Firm* — WOMBLE BOND DICKINSON (US) LLP

(57)          ABSTRACT

This application discloses a method for capturing an image in video recording and an electronic device, and relates to the field of photographing technologies. In response to a first operation, the electronic device collects a first image and displays a first interface; buffers, in a first buffer queue, n frames of first images collected by a camera; selects, based on additional information of the first image and in response to a second operation performed by a user on a snapshot shutter, a second image from the n frames of first images buffered in the first buffer queue; and performs first image processing on m frames of first images including the second image, to obtain a captured image, where the first image processing includes cropping processing performed based on a cropping manner and a cropping parameter of a target preview image.

20 Claims, 17 Drawing Sheets

(51) Int. Cl.
    *H04N 5/77*         (2006.01)
    *H04N 23/667*     (2023.01)

(56)             References Cited

U.S. PATENT DOCUMENTS

| | | | |
|---|---|---|---|
| 12,068,275 B2 | 8/2024 | Saegusa et al. | |
| 2011/0218397 A1* | 9/2011 | Nishiyama | A61B 5/416 |
| | | | 600/109 |
| 2013/0194481 A1 | 8/2013 | Golub et al. | |
| 2013/0208143 A1 | 8/2013 | Chou et al. | |
| 2013/0278604 A1 | 10/2013 | Georgis et al. | |
| 2014/0078343 A1 | 3/2014 | Dai et al. | |
| 2014/0300765 A1* | 10/2014 | Takao | H04N 23/6842 |
| | | | 348/208.1 |
| 2015/0002699 A1 | 1/2015 | Brunner et al. | |
| 2016/0373653 A1* | 12/2016 | Park | H04N 23/6812 |
| 2017/0078573 A1 | 3/2017 | Chen et al. | |
| 2019/0052854 A1* | 2/2019 | Kojima | H04N 9/73 |
| 2020/0402218 A1* | 12/2020 | Okano | H04N 25/60 |
| 2021/0067706 A1* | 3/2021 | Katsumata | H04N 23/667 |
| 2023/0025755 A1* | 1/2023 | Nielsen | A61B 1/000095 |

| | | | |
|---|---|---|---|
| 2023/0032520 A1 | 2/2023 | Chen et al. | |
| 2023/0164290 A1* | 5/2023 | Fukuda | H04N 5/77 |
| | | | 348/143 |
| 2023/0276014 A1 | 8/2023 | Xiao et al. | |
| 2023/0276136 A1 | 8/2023 | Cui et al. | |

FOREIGN PATENT DOCUMENTS

| | | |
|---|---|---|
| CN | 105721741 A | 6/2016 |
| CN | 106791408 A | 5/2017 |
| CN | 110290323 A | 9/2019 |
| CN | 110730305 A | 1/2020 |
| CN | 111970440 A | 11/2020 |
| CN | 112738414 A | 4/2021 |
| CN | 112887583 A | 6/2021 |
| CN | 113810600 A | 12/2021 |
| CN | 113810608 A | 12/2021 |
| CN | 114078724 A | 2/2022 |
| CN | 116320783 A | 6/2023 |
| WO | 2011131758 A1 | 10/2011 |
| WO | 2021208926 A1 | 10/2021 |
| WO | 2022160985 A1 | 8/2022 |

* cited by examiner

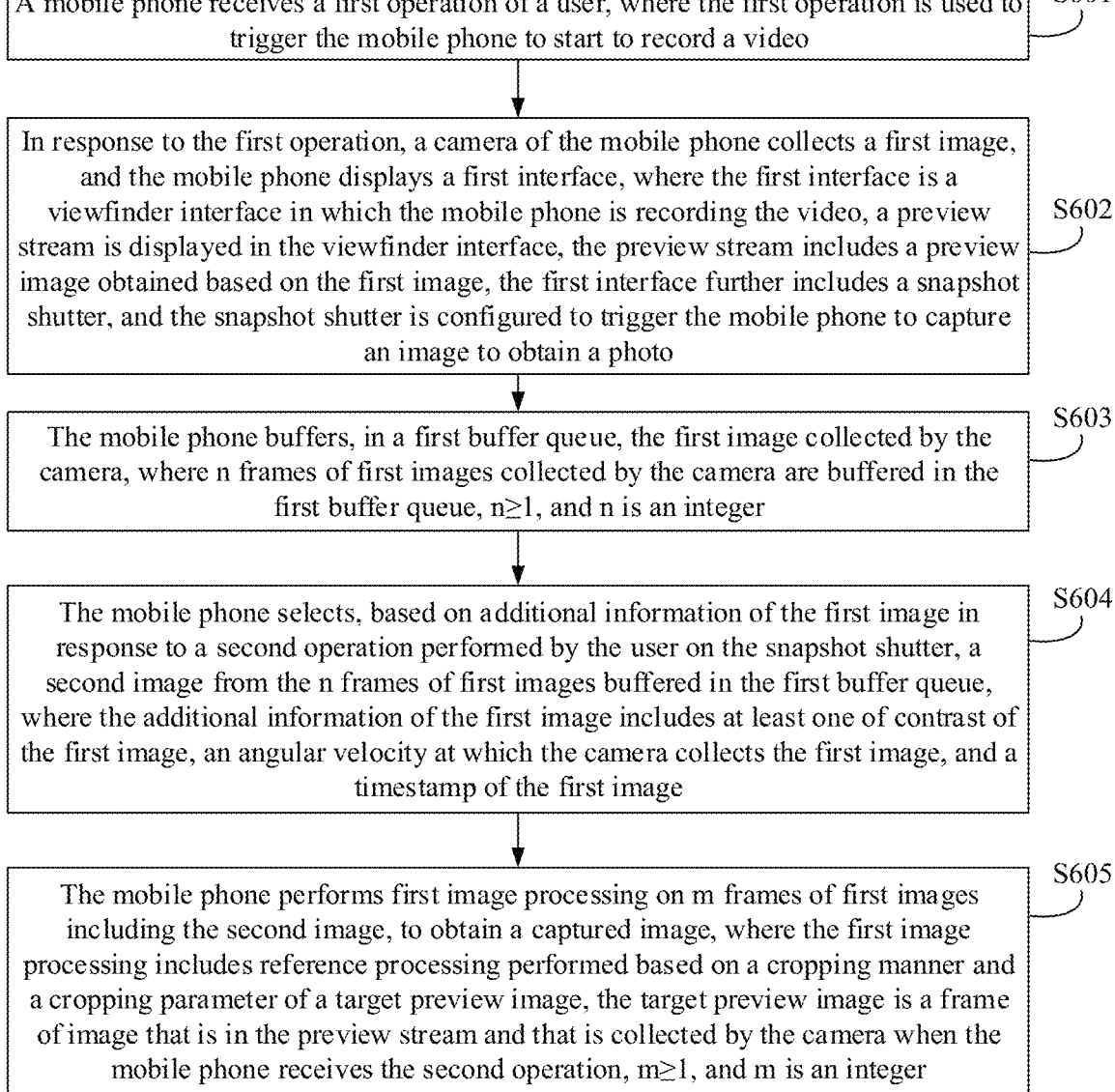

A mobile phone receives a first operation of a user, where the first operation is used to trigger the mobile phone to start to record a video — S601

In response to the first operation, a camera of the mobile phone collects a first image, and the mobile phone displays a first interface, where the first interface is a viewfinder interface in which the mobile phone is recording the video, a preview stream is displayed in the viewfinder interface, the preview stream includes a preview image obtained based on the first image, the first interface further includes a snapshot shutter, and the snapshot shutter is configured to trigger the mobile phone to capture an image to obtain a photo — S602

The mobile phone buffers, in a first buffer queue, the first image collected by the camera, where n frames of first images collected by the camera are buffered in the first buffer queue, n≥1, and n is an integer — S603

The mobile phone selects, based on additional information of the first image in response to a second operation performed by the user on the snapshot shutter, a second image from the n frames of first images buffered in the first buffer queue, where the additional information of the first image includes at least one of contrast of the first image, an angular velocity at which the camera collects the first image, and a timestamp of the first image — S604

The mobile phone performs first image processing on m frames of first images including the second image, to obtain a captured image, where the first image processing includes reference processing performed based on a cropping manner and a cropping parameter of a target preview image, the target preview image is a frame of image that is in the preview stream and that is collected by the camera when the mobile phone receives the second operation, m≥1, and m is an integer — S605

FIG. 6

First buffer queue n frames of first images

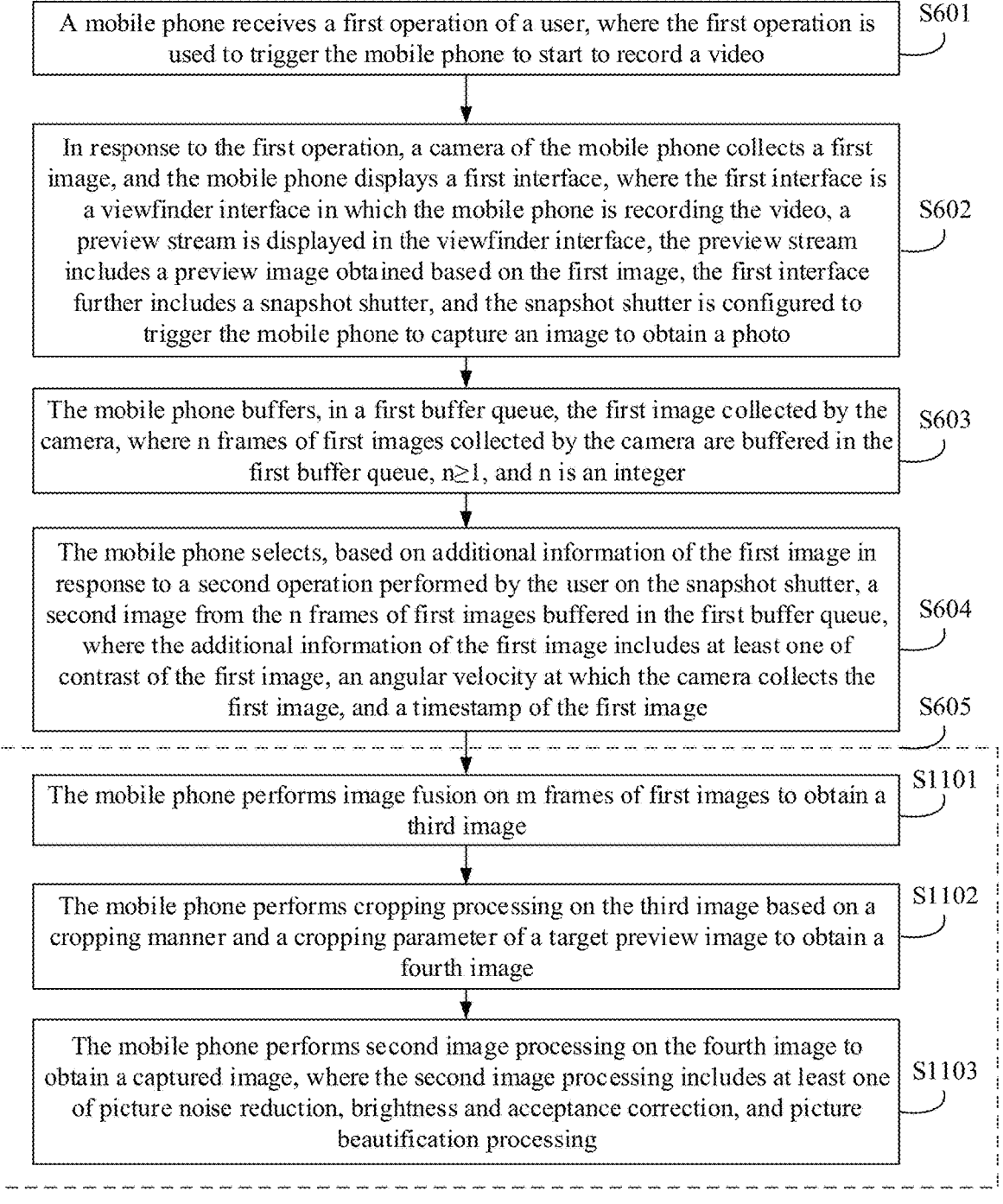

A mobile phone receives a first operation of a user, where the first operation is used to trigger the mobile phone to start to record a video — S601

In response to the first operation, a camera of the mobile phone collects a first image, and the mobile phone displays a first interface, where the first interface is a viewfinder interface in which the mobile phone is recording the video, a preview stream is displayed in the viewfinder interface, the preview stream includes a preview image obtained based on the first image, the first interface further includes a snapshot shutter, and the snapshot shutter is configured to trigger the mobile phone to capture an image to obtain a photo — S602

The mobile phone buffers, in a first buffer queue, the first image collected by the camera, where n frames of first images collected by the camera are buffered in the first buffer queue, n≥1, and n is an integer — S603

The mobile phone selects, based on additional information of the first image in response to a second operation performed by the user on the snapshot shutter, a second image from the n frames of first images buffered in the first buffer queue, where the additional information of the first image includes at least one of contrast of the first image, an angular velocity at which the camera collects the first image, and a timestamp of the first image — S604 / S605

The mobile phone performs image fusion on m frames of first images to obtain a third image — S1101

The mobile phone performs cropping processing on the third image based on a cropping manner and a cropping parameter of a target preview image to obtain a fourth image — S1102

The mobile phone performs second image processing on the fourth image to obtain a captured image, where the second image processing includes at least one of picture noise reduction, brightness and acceptance correction, and picture beautification processing — S1103

FIG. 11

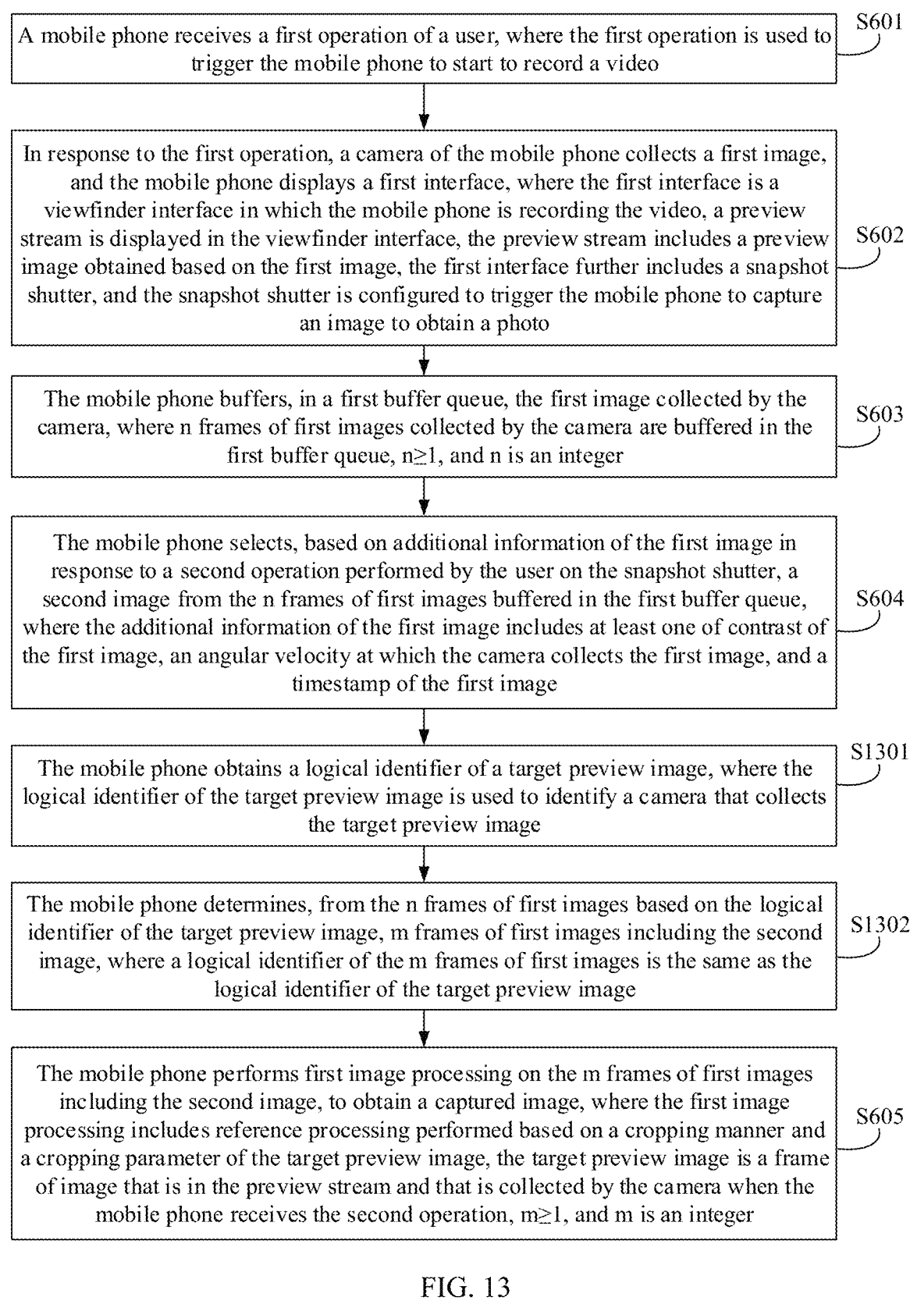

A mobile phone receives a first operation of a user, where the first operation is used to trigger the mobile phone to start to record a video — S601

In response to the first operation, a camera of the mobile phone collects a first image, and the mobile phone displays a first interface, where the first interface is a viewfinder interface in which the mobile phone is recording the video, a preview stream is displayed in the viewfinder interface, the preview stream includes a preview image obtained based on the first image, the first interface further includes a snapshot shutter, and the snapshot shutter is configured to trigger the mobile phone to capture an image to obtain a photo — S602

The mobile phone buffers, in a first buffer queue, the first image collected by the camera, where n frames of first images collected by the camera are buffered in the first buffer queue, n≥1, and n is an integer — S603

The mobile phone selects, based on additional information of the first image in response to a second operation performed by the user on the snapshot shutter, a second image from the n frames of first images buffered in the first buffer queue, where the additional information of the first image includes at least one of contrast of the first image, an angular velocity at which the camera collects the first image, and a timestamp of the first image — S604

The mobile phone obtains a logical identifier of a target preview image, where the logical identifier of the target preview image is used to identify a camera that collects the target preview image — S1301

The mobile phone determines, from the n frames of first images based on the logical identifier of the target preview image, m frames of first images including the second image, where a logical identifier of the m frames of first images is the same as the logical identifier of the target preview image — S1302

The mobile phone performs first image processing on the m frames of first images including the second image, to obtain a captured image, where the first image processing includes reference processing performed based on a cropping manner and a cropping parameter of the target preview image, the target preview image is a frame of image that is in the preview stream and that is collected by the camera when the mobile phone receives the second operation, m≥1, and m is an integer — S605

FIG. 13

METHOD FOR CAPTURING IMAGE IN VIDEO RECORDING AND ELECTRONIC DEVICE

CROSS-REFERENCE TO RELATED APPLICATIONS

This application is a national stage of International Application No. PCT/CN2023/113138, filed on Aug. 15, 2023, which claims priority to Chinese Patent Application No. 202211116174.5, filed on Sep. 14, 2022. The disclosures of both of the aforementioned applications are hereby incorporated by reference in their entireties.

TECHNICAL FIELD

This application relates to the field of photographing technologies, and in particular, to a method for capturing an image in video recording and an electronic device.

BACKGROUND

Existing mobile phones usually have photographing and video recording functions. Increasingly more people use the mobile phones to take photos and videos to record their lives. In a process of recording a video (that is, a video recording process), the mobile phone may collect some wonderful pictures. In the video recording process of the mobile phone, a user may expect the mobile phone to capture the wonderful pictures, save the wonderful pictures as photos, and display the photos to the user. Therefore, a solution in which an image can be captured in the video recording process is urgently needed.

In some solutions, the mobile phone may extract, as a captured image, a frame of image that is in a video stream (such as a preview stream or a video recording stream) and that is collected by the user at a capture moment, save the captured image as a photo, and display the photo to the user. However, in the video recording process of the mobile phone, a large quantity of images (for example, 30 frames of images) need to be processed per second. In this case, an operation resource and time that are reserved for each frame of image are limited. Therefore, the mobile phone may usually use a hardware processing module of an ISP to process the video stream in a simple processing manner, instead of using a complex algorithm to improve image quality. Such an image processing effect can meet only a video requirement. However, photographing requires higher image quality. Consequently, an image that the user is satisfied with cannot be captured by extracting the image in the video stream.

SUMMARY

This application provides a method for capturing an image in video recording and an electronic device, so that an image can be captured in a video recording process and image quality of a captured image can be improved.

Technical solutions in embodiments of this application are as follows:

According to a first aspect, a method for capturing an image in video recording is provided, and the method may be applied to an electronic device. In the method, the electronic device may receive a first operation of a user. The first operation is used to trigger the electronic device to start to record a video. In response to the first operation, a camera of the electronic device collects a first image, and the electronic device displays a first interface. The first interface is a viewfinder interface in which the electronic device is recording the video, a preview stream is displayed in the viewfinder interface, and the preview stream includes a preview image obtained based on the first image. The first interface further includes a snapshot shutter. The snapshot shutter is configured to trigger the electronic device to capture an image to obtain a photo. The electronic device may buffer, in a first buffer queue, the first image collected by the camera, where n frames of first images collected by the camera are buffered in the first buffer queue, $n \geq 1$, and n is an integer.

Then, the electronic device may select, based on additional information of the first image and in response to a second operation performed by the user on the snapshot shutter, a second image from the n frames of first images buffered in the first buffer queue. The additional information of the first image includes at least one of contrast of the first image, an angular velocity at which the camera collects the first image, and a timestamp of the first image. Finally, the electronic device may perform first image processing on m frames of first images including the second image, to obtain a captured image. The first image processing includes simple meal processing performed based on a cropping manner and a cropping parameter of a target preview image, the target preview image is a frame of image that is in the preview stream and that is collected by the camera when the electronic device receives the second operation, $m \geq 1$, and m is an integer. The first image processing has a function of improving image quality of an image.

In one aspect, in this embodiment of this application, the electronic device (such as a mobile phone) may buffer, in the first buffer queue (Buffer), a Bayer image exposed and output by an image sensor (Sensor). The Bayer image may be buffered in the Buffer. In this case, even if there is delay duration (for example, 120 ms-160 ms) from receiving a capture operation of the user to receiving a capture instruction by a Snapshot program, all frames output by the Sensor in the delay duration can be buffered in the Buffer. Therefore, when the electronic device receives the capture operation of the user, a Bayer image output by the Sensor can also be buffered in the first buffer queue. In addition, image content of the frame output by the Sensor does not change significantly in a short time. In this case, a frame selection module of the electronic device may select, as the captured image, a frame of image with good image quality from the Buffer based on additional information of the image buffered in the Buffer. In this way, image quality of the captured image can be improved.

In another aspect, the electronic device may further perform the first image processing on the m frames of first images including the second image, to obtain the captured image. The first image processing includes the cropping processing performed based on the cropping manner and the cropping parameter of the target preview image. Therefore, the electronic device may perform, based on the cropping manner and the cropping parameter of the target preview image, the cropping processing on the m frames of first images including the second image, so that a captured image that is the same as the target preview image in terms of field of view (field of view, FOV) can be obtained, and image quality of the captured image can be improved.

In conclusion, according to the method in this application, an image that meets a user requirement can be captured in a video recording process, and the image quality of the captured image can be improved.

In a possible design manner of the first aspect, the cropping manner of the target preview image includes a center cropping manner, and the cropping parameter of the target preview image includes center point coordinates of a cropping area of the target preview image and cropping size information. It should be understood that the electronic device may perform, in the central cropping manner, the cropping processing on the m frames of first images including the second image. In addition, in a process of performing the cropping processing on the m frames of first images including the second image, a captured image whose size is the same as that of the target preview image and whose FOV is the same as that of the target preview image may be obtained through cropping based on the center point coordinates of the cropping area of the target preview image and the cropping size information. In this way, the image quality of the captured image can be improved.

In another possible design manner of the first aspect, m≥2. That the electronic device performs the first image processing on the m frames of first images including the second image to obtain the captured image may specifically include: The electronic device performs image fusion on the m frames of first images to obtain a third image; the electronic device performs the cropping processing on the third image based on the cropping manner and the cropping parameter of the target preview image to obtain a fourth image; and the electronic device performs second image processing on the fourth image to obtain the captured image. The second image processing includes at least one of picture noise reduction, brightness and acceptance correction, and picture beautification processing. It should be understood that the electronic device fuses a plurality of frames of first images into one frame of image (that is, the third image), and needs to perform the cropping processing on only one frame of image, so that image processing efficiency can be improved, and power consumption of the electronic device can be reduced. In addition, picture noise reduction and brightness and acceptance correction can improve image quality of the captured image, and picture beautification processing can improve a display effect of the captured image. Therefore, when the electronic device performs the second image processing on the fourth image, the image quality and the display effect of the captured image can be improved.

In another possible design manner of the first aspect, the method further includes: The electronic device obtains a logical identifier of the target preview image, where the logical identifier of the target preview image is used to identify a camera that collects the target preview image; and the electronic device determines, from the n frames of first images based on the logical identifier of the target preview image, the m frames of first images including the second image. A logical identifier of the m frames of first images is the same as the logical identifier of the target preview image. In one case, one logical identifier corresponds to one camera. That the logical identifier of the m frames of first images is the same as the logical identifier of the target preview image indicates that a camera collecting the m frames of first images is the same as the camera collecting the target preview image. In this case, the mobile phone may determine, as a frame of image in the m frames of first images, a frame of first image in the n frames of first images that is collected by the camera that is the same as the camera collecting the target preview image. The m frames of first images can be conveniently and quickly determined from the n frames of first images, so that efficiency of generating the captured image can be improved. In another case, one logical identifier may correspond to a plurality of cameras;

or this may be understood as that one logical identifier corresponds to one camera set, and the camera set includes a plurality of cameras. That the logical identifier of the m frames of first images is the same as the logical identifier of the target preview image indicates that a camera collecting the m frames of first images and the camera collecting the target preview image belong to a same camera set. In this case, the mobile phone may determine, as a frame of image in the m frames of first images, a frame of first image collected by each of a plurality of cameras included in the same camera set. A large quantity of first images on which the first image processing is to be performed may be determined, so that the image quality of the captured image can be improved.

In another possible design manner of the first aspect, the m frames of first images are m consecutive frames of images including the second image that are in the n frames of first images; or the m frames of first images include the second image and m−1 frames of first images that are in the n frames of first images and whose resolution is greater than a preset resolution threshold; or the m frames of first images include the second image and m−1 frames of images that are in the n frames of first images and whose high dynamic range parameters meet a preset HDR condition. Specifically, the m consecutive frames of images including the second image are m adjacent frames of first images including the second image. Image content of adjacent images has higher similarity. Therefore, obtaining the captured image by using the m consecutive frames of images is more conducive to improvement of the image quality of the captured image. That the resolution of the m−1 frames of first images is greater than the preset resolution threshold indicates that the resolution of the m−1 frames of first images is relatively high, or may be understood as that definition of the m−1 frames of first images is relatively high. Therefore, obtaining the captured image by using a first image with relatively high resolution is more conducive to improvement of the image quality of the captured image. That the HDR parameters of the m−1 frames of first images meet the preset HDR condition indicates that the m−1 frames of first images have an extremely high brightness dynamic range and richer color, or may be understood as that image quality of the m−1 frames of first images is relatively high. Therefore, obtaining the captured image by using a first image with relatively high image quality is more conducive to improvement of the image quality of the captured image.

In another possible design manner of the first aspect, the additional information of the first image includes the contrast of the first image, and the contrast of the first image is used to represent definition of the first image. The second image is a first image with highest contrast in the n frames of first images buffered in the first buffer queue.

Higher contrast of the first image indicates higher definition of the first image. In this design manner, the electronic device may select an image with highest definition from the n frames of first images as the second image (that is, an alternative captured image). This is conducive to improvement of the image quality of the captured image.

In another possible design manner of the first aspect, the additional information of the first image includes the angular velocity at which the camera collects the first image, and the angular velocity is used to represent a jitter situation existing when the camera collects the first image. The second image is a first image with a minimum angular velocity in the n frames of first images buffered in the first buffer queue.

A greater angular velocity at which the camera collects the first image indicates higher jitter existing when the camera collects the first image. A smaller angular velocity at which the camera collects the first image indicates lower jitter existing when the camera collects the first image. It should be understood that lower jitter existing when the camera collects the first image indicates clearer image quality of the first image, and higher jitter existing when the camera collects the first image indicates blurrier image quality of the first image. In this design manner, the electronic device may select an image with minimum jitter from the n frames of first images as the second image (that is, an alternative captured image). This is conducive to improvement of the image quality of the captured image.

In another possible design manner of the first aspect, the additional information of the first image further includes the timestamp of the first image, each frame of first image includes a timestamp, and the timestamp records time at which an image sensor of the electronic device outputs a corresponding first image. A clock of an upper-layer application in the electronic device is synchronized with a clock of the image sensor that records image output of the first image, or the clock of the upper-layer application in the electronic device and the clock of the image sensor that records image output of the first image are a same system clock. The second image is a first image that is in the n frames of first images buffered in the first buffer queue and whose time recorded by a timestamp is closest to time at which the electronic device receives the second operation.

It may be understood that, if there is a first image whose time recorded by a timestamp is closest to the time at which the electronic device receives the second operation, it indicates a higher probability that the first image is an image that the user wants to capture. Therefore, the electronic device uses, as the second image, the first image whose time recorded by the timestamp is closest to the time at which the electronic device receives the second operation. This helps capture image content that the user really wants.

In another possible design manner of the first aspect, the method further includes: The electronic device collects current temperature of the electronic device. If the current temperature of the electronic device is greater than a preset temperature threshold, the m frames of first images include only the second image, and m=1. If the current temperature of the electronic device is less than or equal to the preset temperature threshold, m≥2. It should be understood that, if current temperature of the mobile phone is greater than the preset temperature threshold, it indicates that the current temperature of the mobile phone is relatively high, and continuing to run with high load may affect performance of the mobile phone. In this case, a thermal escape mechanism may be enabled for the mobile phone. Specifically, only one frame of image (that is, the second image) is used when the first image processing is performed, so that running load of the mobile phone can be reduced, and power consumption of the mobile phone can be reduced. If the current temperature of the mobile phone is less than or equal to the preset temperature threshold, it indicates that the current temperature of the mobile phone is not very high. In this case, the mobile phone may obtain the captured image based on a plurality of frames of first images, so that the image quality of the captured image can be improved.

According to a second aspect, this application provides an electronic device, and the electronic device includes a touchscreen, a memory, a camera, a display, and one or more processors. The touchscreen, the memory, the camera, and the display are coupled to the processor. The memory stores computer program code, and the computer program code includes computer instructions. When the computer instructions are executed by the processor, the electronic device is enabled to perform the method according to the first aspect and any possible design manner thereof.

According to a third aspect, this application provides an electronic device, and the electronic device includes a touchscreen, a memory, a camera, and one or more processors. The touchscreen, the memory, and the camera are coupled to the processor. The memory stores computer program code, and the computer program code includes computer instructions. When the computer instructions are executed by the processor, the electronic device is enabled to perform the following steps: receiving a first operation of a user, where the first operation is used to trigger the electronic device to start to record a video; collecting, by the camera, a first image in response to the first operation, and displaying, by a display, a first interface, where the first interface is a viewfinder interface in which the electronic device is recording the video, a preview stream is displayed in the viewfinder interface, the preview stream includes a preview image obtained based on the first image, the first interface further includes a snapshot shutter, and the snapshot shutter is configured to trigger the electronic device to capture an image to obtain a photo; buffering, in a first buffer queue, the first image collected by the camera, where n frames of first images collected by the camera are buffered in the first buffer queue, n≥1, and n is an integer; selecting, based on additional information of the first image in response to a second operation performed by the user on the snapshot shutter, a second image from the n frames of first images buffered in the first buffer queue, where the additional information of the first image includes at least one of contrast of the first image, an angular velocity at which the camera collects the first image, and a timestamp of the first image; and performing first image processing on m frames of first images including the second image, to obtain a captured image, where the first image processing includes cropping processing performed based on a cropping manner and a cropping parameter of a target preview image, the target preview image is a frame of image that is in the preview stream and that is collected by the camera when the electronic device receives the second operation, m≥1, and m is an integer. The first image processing has a function of improving image quality of an image.

With reference to the third aspect, in a possible design manner, the cropping manner of the target preview image includes a center cropping manner, and the cropping parameter of the target preview image includes center point coordinates of a cropping area of the target preview image and cropping size information.

With reference to the third aspect, in another possible design manner, m≥2. When the computer instructions are executed by the processor, the electronic device is enabled to further perform the following steps: performing image fusion on the m frames of first images to obtain a third image; performing the cropping processing on the third image based on the cropping manner and the cropping parameter of the target preview image to obtain a fourth image; and performing second image processing on the fourth image to obtain the captured image, where the second image processing includes at least one of picture noise reduction, brightness and acceptance correction, and picture beautification processing.

With reference to the third aspect, in another possible design, when the computer instructions are executed by the processor, the electronic device may be enabled to further perform the following steps: obtaining a logical identifier of the target preview image, where the logical identifier of the target preview image is used to identify a camera that collects the target preview image; and determining, from the n frames of first images based on the logical identifier of the target preview image, the m frames of first images including the second image, where a logical identifier of the m frames of first images is the same as the logical identifier of the target preview image.

With reference to the third aspect, in another possible design, the m frames of first images are m consecutive frames of images including the second image that are in the n frames of first images; or the m frames of first images include the second image and m−1 frames of first images that are in the n frames of first images and whose resolution is greater than a preset resolution threshold; or the m frames of first images include the second image and m−1 frames of first images that are in the n frames of first images and whose HDR parameters meet a preset HDR condition.

With reference to the third aspect, in another possible design manner, the additional information of the first image includes the contrast of the first image, and the contrast of the first image is used to represent definition of the first image. The second image is a first image with highest contrast in the n frames of first images buffered in the first buffer queue.

With reference to the third aspect, in another possible design manner, the additional information of the first image includes the angular velocity at which the camera collects the first image, and the angular velocity is used to represent a jitter situation existing when the camera collects the first image. The second image is a first image with a minimum angular velocity in the n frames of first images buffered in the first buffer queue.

With reference to the third aspect, in another possible design manner, the additional information of the first image further includes the timestamp of the first image, each frame of first image includes a timestamp, and the timestamp records time at which an image sensor of the electronic device outputs a corresponding first image. A clock of an upper-layer application in the electronic device is synchronized with a clock of the image sensor that records image output of the first image, or the clock of the upper-layer application in the electronic device and the clock of the image sensor that records image output of the first image are a same system clock.

The second image is a first image that is in the n frames of first images buffered in the first buffer queue and whose time recorded by a timestamp is closest to time at which the electronic device receives the second operation.

With reference to the third aspect, in another possible design manner, when the computer instructions are executed by the processor, the electronic device may be enabled to further perform the following step: collecting current temperature of the electronic device. If the current temperature of the electronic device is greater than a preset temperature threshold, the m frames of first images include only the second image, and m=1; and if the current temperature of the electronic device is less than or equal to the preset temperature threshold, m≥2.

According to a fourth aspect, this application provides a computer-readable storage medium. The computer-readable storage medium includes computer instructions. When the computer instructions are run on an electronic device, the electronic device is enabled to perform the method according to the first aspect and any possible design manner thereof.

According to a fifth aspect, this application provides a computer program product. When the computer program product runs on a computer, the computer is enabled to perform the method according to the first aspect and any possible design manner thereof. The computer may be the foregoing electronic device.

It may be understood that, for beneficial effects that can be achieved by the electronic devices according to the second aspect, the third aspect, and any possible design manner thereof, the computer storage medium according to the fourth aspect, and the computer program product according to the fifth aspect, refer to the beneficial effects of the first aspect and any the possible design manner thereof. Details are not described herein again.

BRIEF DESCRIPTION OF DRAWINGS

FIG. 6 is a flowchart of a method for capturing an image in video recording according to an embodiment of this application;

FIG. 11 is a flowchart of another method for capturing an image in video recording according to an embodiment of this application;

FIG. 13 is a flowchart of another method for capturing an image in video recording according to an embodiment of this application.

DESCRIPTION OF EMBODIMENTS

To make persons of ordinary skill in the art better understand the technical solutions in this application, the following clearly and completely describes the technical solutions in embodiments of this application with reference to the accompanying drawings.

It should be noted that, terms "first", "second", and the like in the specification, claims, and the accompanying drawings of this application are intended to distinguish similar objects but do not necessarily indicate a specific order or sequence. It should be understood that data used in this way is interchangeable in appropriate circumstances, so that the embodiments of this application described herein can be implemented in other orders than the order illustrated or described herein. Implementations described in the following example embodiments do not represent all implementations consistent with this application. On the contrary, the implementations are only examples of apparatuses and methods consistent with some aspects of this application as detailed in the appended claims.

It should be further understood that the term "include" indicates presence of a described feature, entirety, step, operation, element, and/or component, but does not exclude presence or addition of one or more other features, entireties, steps, operations, elements, and/or components. In the descriptions of the embodiments, unless otherwise stated, "a plurality of" means two or more.

Currently, in a video recording process of a mobile phone, an image sensor (Sensor) of the mobile phone can continuously output Bayer (Bayer) images under the control of exposure. Each frame of Bayer image is processed by an image signal processor (image signal processor, ISP) of the mobile phone, and then encoded by using an encoder (ENCODER). In this way, a video stream (such as a preview stream or a video recording stream) can be obtained.

Figure 1:
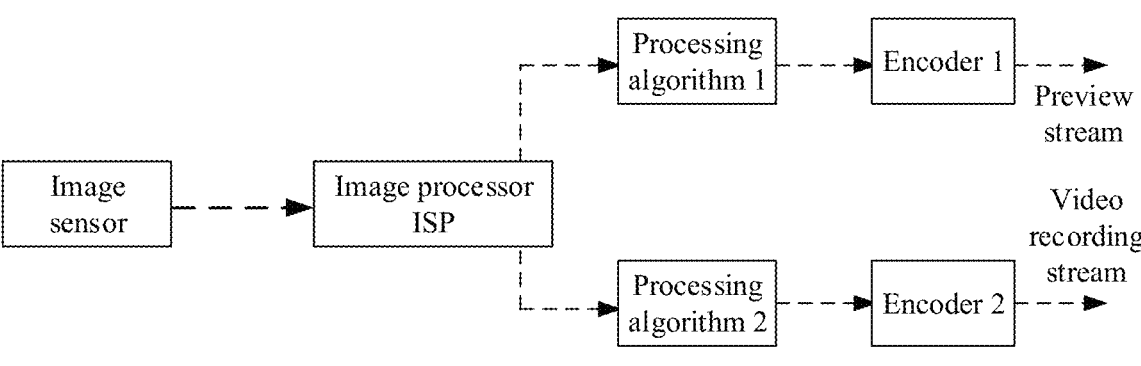
FIG. 1 is a diagram of a processing procedure in which a Sensor outputs an image and an ISP and an ENCODE process the image to obtain a high-definition image.

FIG. 1 shows a processing procedure of a preview stream and a video recording stream in a mobile phone after an image sensor (Sensor) outputs an image in a video recording process of the mobile phone. The preview stream is a video stream presented to a user on a display in the video recording process of the mobile phone. The video recording stream is a video stream stored in the mobile phone for the user to view after video recording ends.

As shown in FIG. 1, after the image sensor outputs the image, the ISP may perform image processing on the image. After the image processing is performed by the ISP, the image may be divided into two data streams. One data stream is processed by using a processing algorithm 1 shown in FIG. 1, and then may be encoded by an encoder 1 to obtain the preview stream. The other data stream is processed by using a processing algorithm 2 shown in FIG. 1, and then may be encoded by an encoder 2 to obtain the video recording stream.

The processing algorithm 1 may also be referred to as a post-processing algorithm of the preview stream, and the processing algorithm 2 may also be referred to as a post-processing algorithm of the video recording stream. The processing algorithm 1 and the processing algorithm 2 may include processing functions such as image stabilization processing, denoising processing, blurring processing, and color and brightness adjustment.

It should be noted that a manner in which the mobile phone processes the preview stream and the video recording stream in the video recording process includes but is not limited to the manner shown in FIG. 1. For example, after the image sensor outputs the image, the ISP may perform a part of image processing (such as image processing in a "RAW domain" and image processing in an "RGB domain") on the image. Then, the image may be divided into two data streams. One data stream is processed by using a processing algorithm 1. Then, the ISP performs another part of image processing (for example, image processing in a "YUV domain"), and then an encoder 1 performs encoding to obtain the preview stream. The other data stream is processed by using a processing algorithm 2. Then, the ISP performs another part of image processing (for example, the image processing in the "YUV domain"), and then an encoder 2 performs encoding to obtain the video recording stream. In the following embodiment, the processing manner of the preview stream and the video recording stream shown in FIG. 1 is used as an example to describe a method in the embodiments of this application.

It should be noted that both an objective of outputting the image by the Sensor and an objective of processing the image by the ISP and the encoder (namely, ENCODER, for example, the encoder 1 and the encoder 2) are to record a video. Therefore, data streams (such as the preview stream and the video recording stream) in an entire process in which the Sensor outputs the image and the ISP and the encoder (ENCODER) process the image can be referred to as the video stream.

Figure 2:
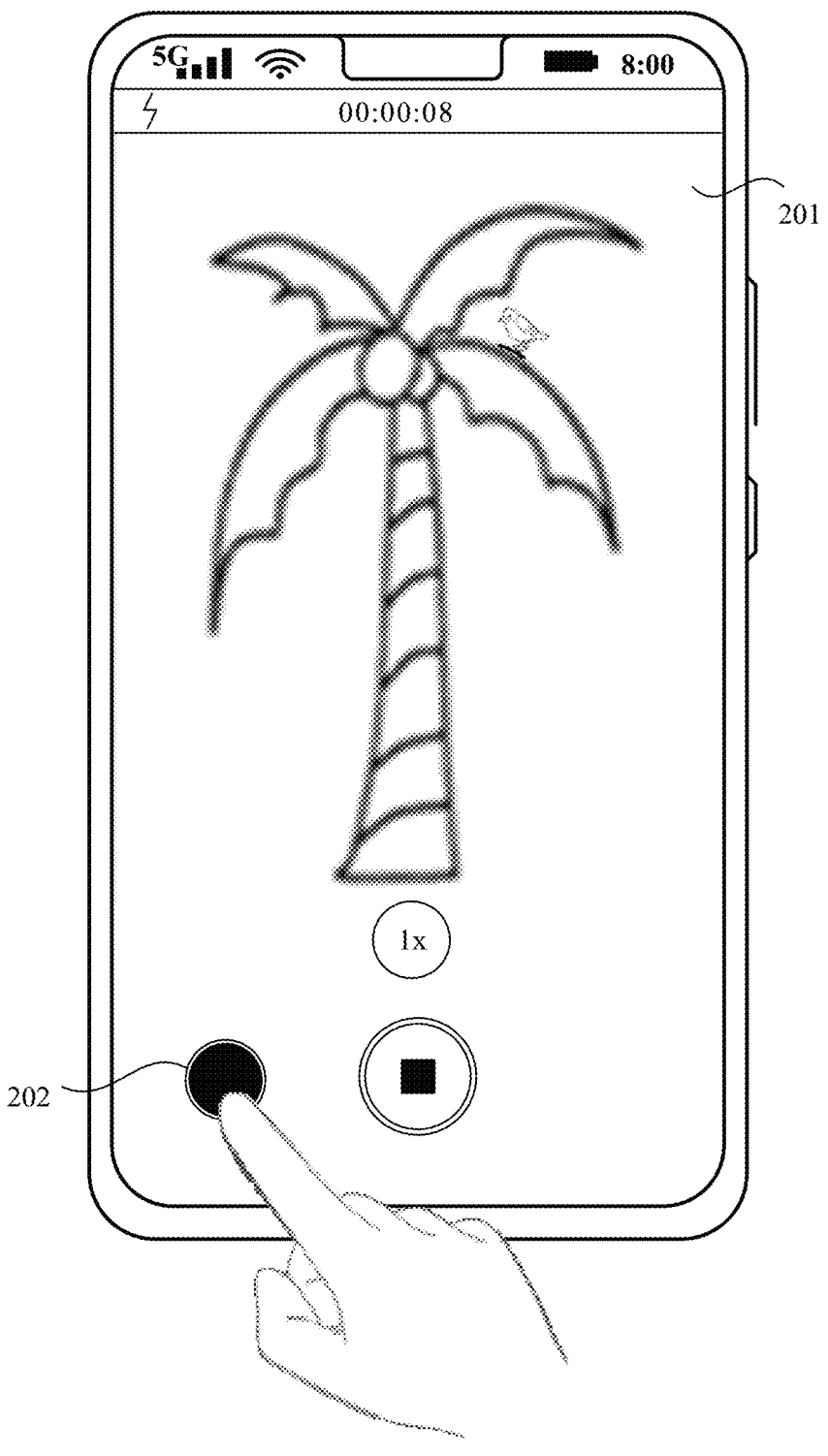
FIG. 2 is a schematic diagram of a viewfinder interface for video recording of a mobile phone according to an embodiment of this application.

In the video recording process of the mobile phone, the mobile phone may capture an image in response to an operation of the user. For example, the mobile phone may display a viewfinder interface 201 for video recording shown in FIG. 2. The viewfinder interface 201 for video recording includes a snapshot shutter 202, and the snapshot shutter 202 is configured to trigger the mobile phone to capture an image in the video recording process and save the image as a photo. The mobile phone may capture the image in response to a tap operation performed by the user on the snapshot shutter 202 shown in FIG. 2. The user expects the mobile phone to capture an image collected by a camera at a moment when the user taps the snapshot shutter 202.

Figure 3:
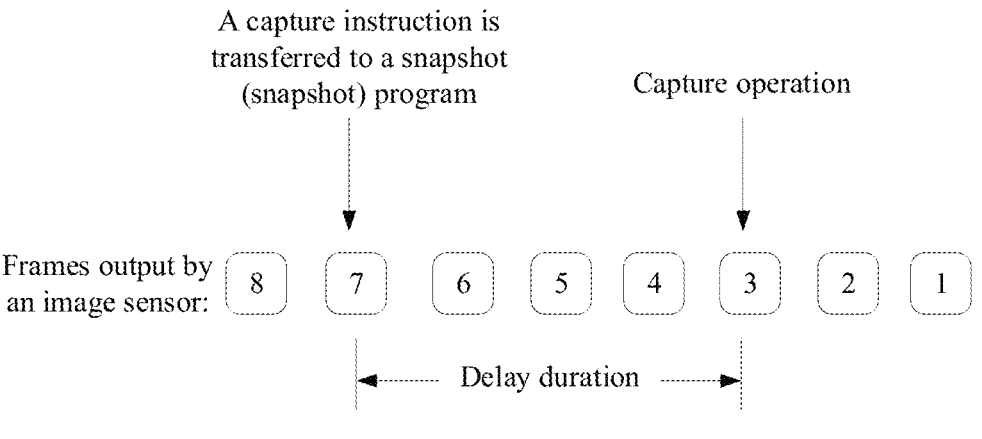
FIG. 3 is a schematic diagram of delay duration from receiving a capture operation by a mobile phone to receiving a capture indication by a Sensor according to an embodiment of this application.

To capture the image during video recording of the mobile phone, in some technical solutions, when a snapshot (Snapshot) program of the mobile phone receives a capture instruction, a collected $1^{st}$ frame of image may be used as a captured image (for example, a $7^{th}$ frame of image shown in FIG. 3). However, after an upper-layer application (a camera application corresponding to the viewfinder interface 201 for video recording shown in FIG. 2) receives a capture operation of the user (for example, the tap operation performed by the user on the snapshot shutter 202), it takes time (for example, delay duration shown in FIG. 3) to transmit the capture instruction to the Snapshot (Snapshot) program. In this period of time (for example, the delay duration shown in FIG. 3), the Sensor does not stop outputting a Bayer image. Therefore, from receiving the capture operation of the user by the upper-layer application to receiving the capture instruction by the Snapshot program, the Sensor may probably have output a plurality of frames of Bayer images.

For example, as shown in FIG. 3, it is assumed that when the image sensor (Sensor) outputs a $3^{rd}$ frame of Bayer image, the upper-layer application receives the capture operation, and when the Sensor outputs a $7^{th}$ frame of Bayer image, the capture instruction is transferred to the Snapshot program. In this case, if a solution in a conventional technology is used, due to the delay duration shown in FIG. 3, the $7^{th}$ frame of image is not the frame of image at the moment when the user taps the snapshot shutter 202. A frame of image that the user really wants cannot be captured by using this solution. It should be noted that, in eight frames of images shown in FIG. 3, a $1^{st}$ frame of image is an earliest frame of image output by the Sensor, and an $8^{th}$ frame of image is a latest frame of image output by the Sensor. The image sensor (Sensor) may sequentially expose and output the eight frames of images shown in FIG. 3 starting from the $1^{st}$ frame of image.

In some other embodiments, the mobile phone may extract, as a captured image, a frame of image that is in the video stream (such as the preview stream and the video recording stream) and that is collected by the user at a capture moment, save the captured image as a photo, and display the photo to the user.

However, in the video recording process of the mobile phone, a large quantity of images (for example, 30 frames of images) need to be processed per second. In this case, an operation resource and time that are reserved for each frame of image are limited. Therefore, the mobile phone may usually use a hardware processing module of the ISP to process the video stream in a simple processing manner, instead of using a complex algorithm to improve image quality (for example, denoising and brightening). Such an image processing effect can meet only a video requirement. However, photographing requires higher image quality. Consequently, an image that the user is satisfied with cannot be captured by extracting the image in the video stream.

Figure 4A:
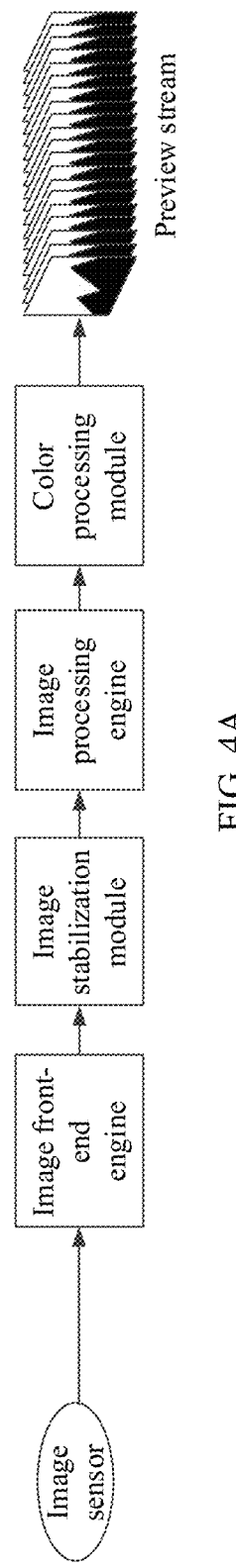
FIG. 4A is a block diagram of a principle of a method used by a mobile phone to extract a frame of image from a video stream as a captured image according to an embodiment of this application.

For example, as shown in FIG. 4A, after each frame of Bayer image output by the image sensor (Sensor) of the mobile phone passes through an image front-end engine, an image stabilization module, an image processing engine, and a color processing module of the mobile phone, the preview stream can be obtained. Specifically, the image front-end engine may be the ISP in FIG. 1, FIG. 4C, and FIG. 4D. The image front-end engine is configured to perform a part of image processing (for example, image processing in a "RAW domain" and image processing in an "RGB domain") on each frame of Bayer image. The image stabilization module, the image processing engine, and the color processing module may be functional modules corresponding to image processing performed by using the processing algorithm 1 in FIG. 1, FIG. 4C, and FIG. 4D. The image stabilization module is a functional module corresponding to image stabilization processing, and is configured to perform image stabilization processing on each frame of Bayer image. The image processing engine may be a functional module corresponding to denoising processing, and is configured to perform denoising processing on each frame of Bayer image. The color processing module is a functional module corresponding to color and brightness adjustment, and is configured to perform processing such as color and brightness adjustment on each frame of Bayer image. The mobile phone may extract, as a captured image, a frame of image that is in the preview stream and that is collected by the user at the capture moment, save the captured image as a photo, and display the photo to the user.

In some other embodiments, the mobile phone may further save, as a captured image, a photographed image obtained by the user in a photographing process, save the captured image as a photo, and display the photo to the user.

However, the photographed image obtained by the user in the photographing process is implemented based on a photographing function included in the mobile phone (specifically, the upper-layer application), and is not an image captured by the user in the video recording process. Each detail in the recording process cannot be effectively presented to the user, and the image that the user is satisfied with cannot be captured.

Figures 4B, 4C:
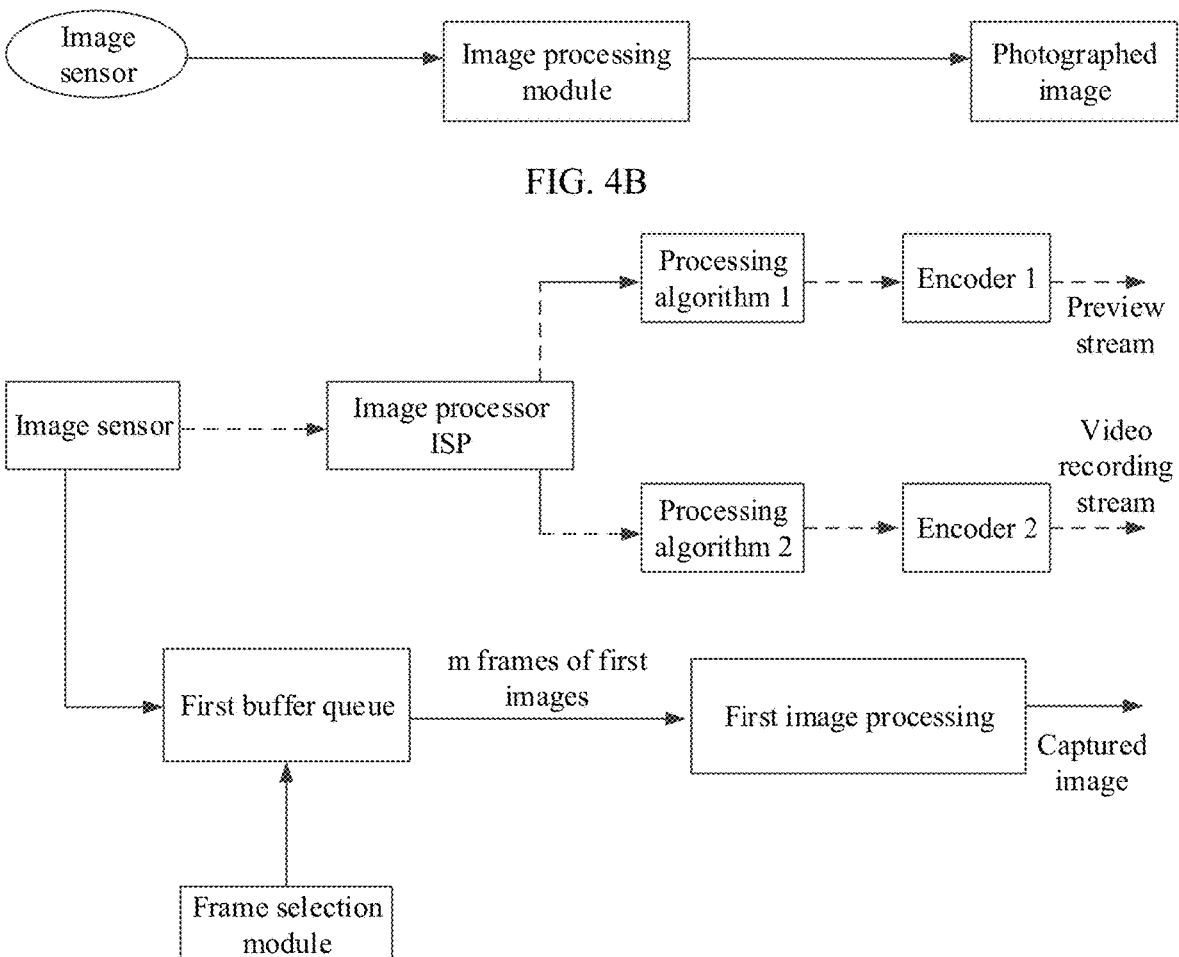
FIG. 4B is a block diagram of a principle of a method used by a mobile phone to use, as a captured image, a photographed image obtained by a user in a photographing process according to an embodiment of this application.
FIG. 4C is a block diagram of a principle of a method for capturing an image in video recording according to an embodiment of this application.

For example, as shown in FIG. 4B, after each frame of Bayer image output by the image sensor (Sensor) of the mobile phone passes through the image processing module of the mobile phone, a photographed image can be generated. The mobile phone may save the photographed image as a captured image, save the captured image as a photo, and display the photo to the user. Specifically, the image processing module may include processing functions such as image stabilization processing, denoising processing, blurring processing, and color and brightness adjustment. In other words, the image processing module is configured to perform image stabilization processing, denoising processing, blurring processing, and color and brightness adjustment on each frame of Bayer image.

An embodiment of this application provides a method for capturing an image in video recording, so that an image can be captured in a video recording process, and image quality of a captured image can be improved.

In one aspect, in this embodiment of this application, as shown in FIG. 4C, an electronic device (for example, a mobile phone) may buffer, in a first buffer queue (Buffer), a first image (that is, a Bayer image) exposed and output by a Sensor. A plurality of frames of first images (that is, Bayer images) may be buffered in the Buffer. In this way, even if there is delay duration (for example, 120 ms-160 ms) shown in FIG. 3 from receiving a capture operation of a user to receiving a capture instruction by a Snapshot program, all frames output by the Sensor in the delay duration can be buffered in the Buffer. Therefore, when the mobile phone receives the capture operation of the user, the Bayer image output by the sensor may also be buffered in the first buffer queue. In addition, image content of the frame output by the Sensor does not change significantly in a short time. In this way, as shown in FIG. 4C, in response to receiving the capture instruction by the Snapshot program, a frame selection module of the mobile phone may select an image (that is, a second image) with relatively good image quality from the Buffer to generate a captured image. In this way, image quality of the captured image can be improved.

In another aspect, as shown in FIG. 4C, the electronic device may further perform first image processing on m frames of first images including the second image, to obtain a captured image. The first image processing includes cropping processing performed based on a cropping manner and a cropping parameter of a target preview image. Therefore, the electronic device may perform, based on the cropping manner and the cropping parameter of the target preview image, the cropping processing on the m frames of first images including the second image, so that a captured image that is the same as the target preview image in terms of field of view FOV can be obtained, and image quality of the captured image can be improved.

In conclusion, according to the method in this embodiment of this application, an image that meets a user requirement can be captured in the video recording process, and the image quality of the captured image can be improved.

Figure 4D:
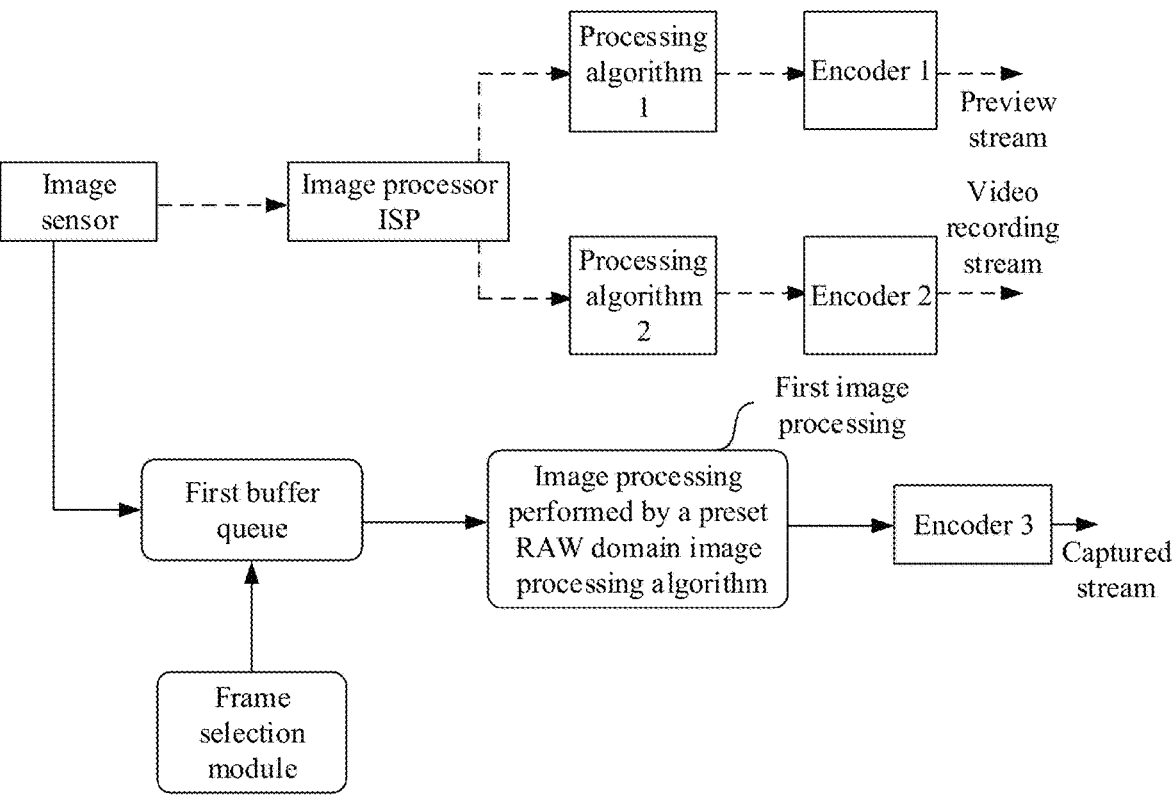
FIG. 4D is a block diagram of a principle of another method for capturing an image in video recording according to an embodiment of this application.

In addition, as shown in FIG. 4D, the first image processing may further include image processing performed by a preset RAW domain AI image enhancement algorithm model (referred to as a preset RAW domain image process-ing algorithm for short). The electronic device may process, by using the preset RAW domain image processing algorithm, a captured frame selected by the frame selection module. Finally, an encoder 3 encodes a processing result to obtain a captured stream.

The preset RAW domain image processing algorithm is a deep learning network for image quality enhancement in a RAW domain. In this solution, the preset RAW domain image processing algorithm may be used to improve image quality of the captured frame. In other words, according to the method in this embodiment of this application, an image that meets a user requirement can be captured in the video recording process, and the image quality of the captured image can be improved.

The preset RAW domain image processing algorithm is a deep learning network for image quality enhancement in a RAW domain. The preset RAW domain image processing algorithm may also be referred to as a preset image quality enhancement algorithm, a preset image quality enhancement algorithm model, or a preset RAW domain AI model.

In some embodiments, the preset RAW domain image processing algorithm may be a software image processing algorithm. The preset RAW domain image processing algorithm may be a software algorithm in an algorithm library at a hardware abstraction layer (hardware abstraction layer, HAL) of the mobile phone.

In some other embodiments, the preset RAW domain image processing algorithm may be a hardware image processing algorithm. The preset RAW domain image processing algorithm may be a hardware image processing algorithm implemented by invoking an image processing algorithm capability of an ISP.

It should be noted that the preset RAW domain image processing algorithm may also be referred to as a preset image processing algorithm. In this embodiment of this application, a reason why the algorithm is referred to as the preset RAW domain image processing algorithm is that an image in the RAW domain is input to the preset RAW domain image processing algorithm. The preset RAW domain image processing algorithm may output an image in the RAW domain, or may output an image in the RGB domain. This is not limited in this embodiment of this application.

The encoder 1, the encoder 2, and the encoder 3 may be three different encoders. The mobile phone may respectively encode the preview stream, the video recording stream, and the captured stream by using the three different encoders. Alternatively, the encoder 1, the encoder 2, and the encoder 3 may be a same encoder. One encoder may include a plurality of encoding units. The mobile phone may respectively encode the preview stream, the video recording stream, and the captured stream by using three different encoding units in one encoder. Alternatively, the encoder 1 and the encoder 2 may be two different encoding units in a same encoder, and the encoder 3 may be another encoder.

Encoding manners of different encoders may be the same or different. Encoding manners of different encoding units in a same encoder may be the same or different. Therefore, formats of images output by an encoder in the foregoing display module and the encoder 1 may be the same or different. For example, images output by the encoder in the display module and the encoder 1 may be images in any format, for example, joint photographic experts group (Joint Photographic Experts Group, JPEG) or tag image file format (Tag Image File Format, TIFF).

The image output by the image sensor (Sensor) shown in FIG. 1, FIG. 4A, FIG. 4B, FIG. 4C, or FIG. 4D is an image in a Bayer (Bayer) format (referred to as a Bayer image for short). Bayer, JPEG, and TIFF are three expression formats of an image. For detailed descriptions of the Bayer image and a JPEG image, refer to related content in a conventional technology. Details are not described herein again.

For example, the electronic device in this embodiment of this application may be a mobile phone, a tablet computer, a smartwatch, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality, VR) device, or the like that includes a camera. A specific form of the electronic device is not specifically limited in this embodiment of this application.

Figure 5A:
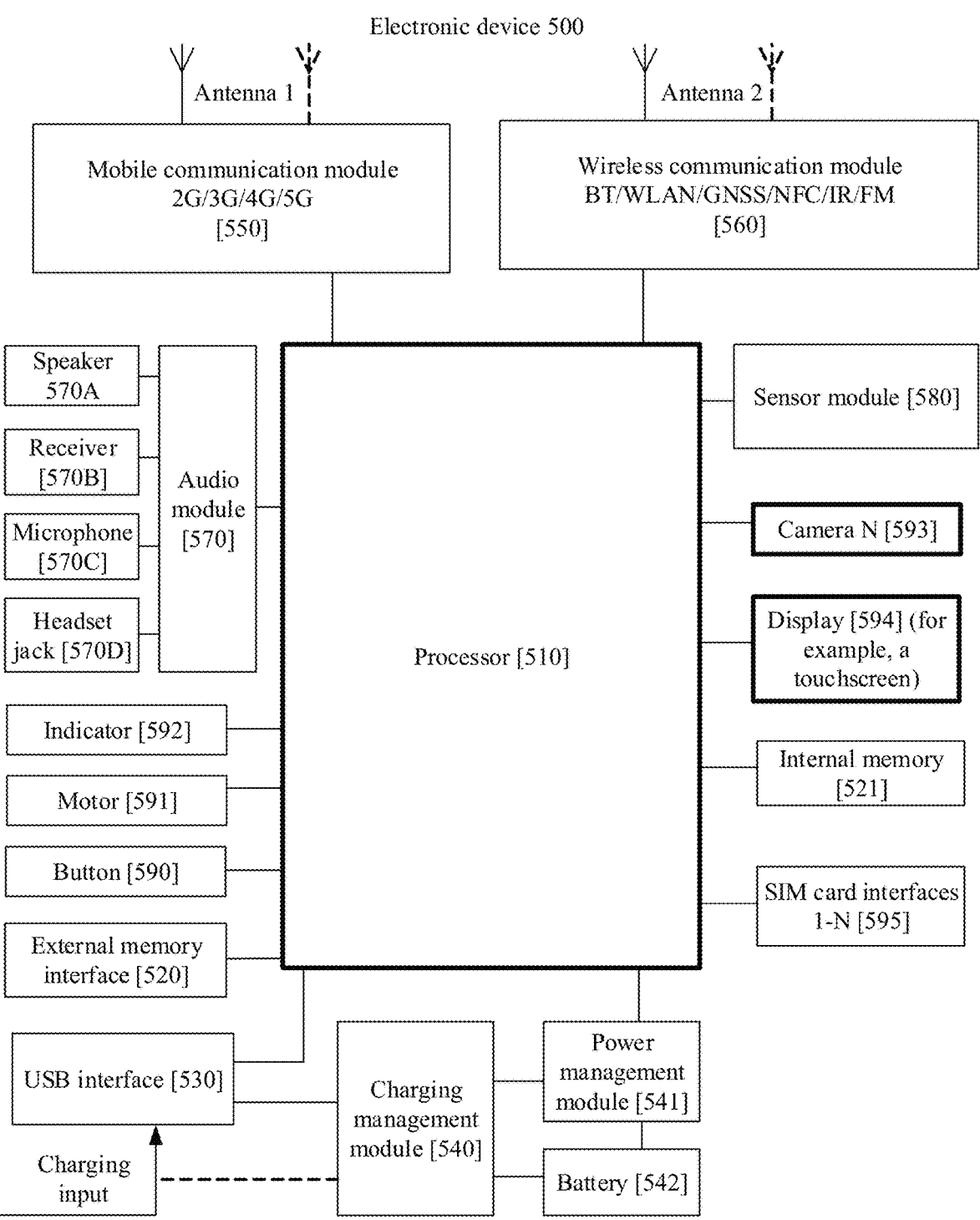
FIG. 5A is a schematic diagram of a structure of an electronic device 500 according to an embodiment of this application.

Implementations of the embodiments of this application are described below in detail with reference to the accompanying drawings. FIG. 5A is a schematic diagram of a structure of an electronic device 500 according to an embodiment of this application. As shown in FIG. 5A, the electronic device 500 may include a processor 510, an external memory interface 520, an internal memory 521, a universal serial bus (universal serial bus, USB) interface 530, a charging management module 540, a power manage-ment module 541, a battery 542, an antenna 1, an antenna 2, a mobile communication module 550, a wireless communi-cation module 560, an audio module 570, a speaker 570A, a receiver 570B, a microphone 570C, a headset jack 570D, a sensor module 580, a button 590, a motor 591, an indicator 592, a camera 593, a display 594, a subscriber identification module (subscriber identification module, SIM) card inter-face 595, and the like.

The sensor module 580 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It can be understood that the structure illustrated in this embodiment does not constitute a specific limitation on the electronic device 500. In some other embodiments, the electronic device 500 may include more or fewer compo-nents than those shown in the figure, or combine some components, or split some components, or have different component arrangements. The illustrated components may be implemented by hardware, software, or a combination of software and hardware.

The processor 510 may include one or more processing units. For example, the processor 510 may include an application processor (application processor, AP), a modem processor, a GPU, an image signal processor (image signal processor, ISP), a controller, a memory, a video codec, a digital signal processor (digital signal processor, DSP), a baseband processor, and/or an NPU. Different processing units may be independent components, or may be integrated into one or more processors.

The controller may be a nerve center and a command center of the electronic device 500. The controller may generate an operation control signal based on instruction operation code and a time sequence signal, to complete control of instruction fetching and instruction execution.

A memory may be further disposed in the processor 510, and is configured to store instructions and data. In some embodiments, the memory in the processor 510 is a cache memory. The memory may store instructions or data recently used or cyclically used by the processor 510. If the processor 510 needs to use the instructions or the data again, the processor 510 may directly invoke the instructions or the data from the memory. This avoids repeated access and reduces waiting time of the processor 510, thereby improving system efficiency.

In some embodiments, the processor 510 may include one or more interfaces. It may be understood that an interface connection relationship between modules illustrated in this embodiment is merely an example for description, and does not constitute a limitation on the structure of the electronic device 500. In some other embodiments, the electronic device 500 may alternatively use an interface connection manner different from that in the foregoing embodiment, or use a combination of a plurality of interface connection manners.

The charging management module 540 is configured to receive a charging input from a charger. When charging the battery 542, the charging management module 540 may further supply power to the electronic device by using the power management module 541.

The power management module 541 is configured to connect the battery 542, the charging management module 540, and the processor 510. The power management module 541 receives an input from the battery 542 and/or the charging management module 540, and supplies power to the processor 510, the internal memory 521, the external memory, the display 594, the camera 593, the wireless communication module 560, and the like.

A wireless communication function of the electronic device 500 may be implemented by using the antenna 1, the antenna 2, the mobile communication module 550, the wireless communication module 560, the modem processor, the baseband processor, and the like.

The antenna 1 and the antenna 2 are configured to transmit and receive electromagnetic wave signals. In some embodiments, the antenna 1 and the mobile communication module 550 in the electronic device 500 are coupled, and the antenna 2 and the wireless communication module 560 are coupled, so that the electronic device 500 can communicate with a network and another device by using a wireless communication technology.

The electronic device 500 implements a display function by using the GPU, the display 594, the application processor, and the like. The GPU is a microprocessor for image processing, and is connected to the display 594 and the application processor. The GPU is configured to perform mathematical and geometric computing for graphics rendering. The processor 510 may include one or more GPUs, and the GPU executes program instructions to generate or change display information.

The display 594 is configured to display an image, a video, and the like. The display 594 includes a display panel. The display panel may be a liquid crystal display (liquid crystal display, LCD), an organic light-emitting diode (organic light-emitting diode, OLED), an active-matrix organic light emitting diode or active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like.

The electronic device 500 may implement a photographing function by using the ISP, the camera 593, the video codec, the GPU, the display 594, the application processor, and the like.

The ISP is configured to process data fed back by the camera 593. For example, during photographing, a shutter is opened, and light is transferred to a photosensitive element of the camera through a lens. An optical signal is converted into an electrical signal. The photosensitive element of the camera transfers the electrical signal to the ISP for processing, to convert the electrical signal into an image visible to naked eyes. The ISP may further perform algorithm optimization on noise, brightness, and complexion of the image. The ISP may further optimize parameters such as exposure and color temperature of a photographing scene. In some embodiments, the ISP may be disposed in the camera 593.

The camera 593 is configured to capture a still image or a video. An optical image of an object is generated through the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 500 may include N cameras 593, where N is a positive integer greater than 1.

The digital signal processor is configured to process a digital signal, and may process another digital signal in addition to processing the digital image signal. For example, when the electronic device 500 selects a frequency, the digital signal processor is configured to perform Fourier transform or the like on energy of the frequency.

The video codec is configured to compress or decompress a digital video. The electronic device 500 may support one or more video codecs. In this way, the electronic device 500 may play or record videos in a plurality of encoding formats such as moving picture experts group (moving picture experts group, MPEG)1, MPEG2, MPEG3, and MPEG4.

The NPU is a neural-network (neural-network, NN) computing processor, which quickly processes input information by referring to a biological neural network structure, for example, by referring to a transferring mode between human brain neurons, and may further perform self-learning continuously. The NPU may implement applications such as intelligent cognition of the electronic device 500, for example, image recognition, face recognition, speech recognition, and text understanding.

The external memory interface 520 may be configured to connect to an external memory card, such as a Micro SD card, to extend a storage capability of the electronic device 500. The external storage card communicates with the processor 510 by using the external memory interface 520, to implement a data storage function, for example, to store files such as music and a video in the external memory card.

The internal memory 521 may be configured to store computer-executable program code, and the executable program code includes instructions. The processor 510 runs the instructions stored in the internal memory 521, to perform various function applications and data processing of the electronic device 500. For example, in this embodiment of this application, the processor 510 may execute the instructions stored in the internal memory 521, and the internal memory 521 may include a program storage area and a data storage area.

The program storage area may store an operating system, an application required by at least one function (for example, a sound playing function or an image playing function), and the like. The data storage area may store data (such as audio data and a phone book) and the like created during use of the electronic device 500. In addition, the internal memory 521 may include a high-speed random access memory, and may further include a non-volatile memory, for example, at least one magnetic disk storage device, a flash memory device, or a universal flash storage (universal flash storage, UFS).

The electronic device 500 may implement an audio function by using the audio module 570, the speaker 570A, the receiver 570B, the microphone 570C, the headset jack 570D, the application processor, and the like, for example, music playing and recording.

The button 590 includes a power-on button, a volume button, or the like. The motor 591 may generate a vibration prompt. The indicator 592 may be an indicator light, and may be configured to indicate a charging state and a power change, or to indicate a message, a missed call, a notification, or the like.

The SIM card interface 595 is configured to connect to a SIM card. The SIM card may be inserted into the SIM card interface 595 or pulled out of the SIM card interface 595, so that the SIM card is in contact with or separated from the electronic device 500. The electronic device 500 may support one or N SIM card interfaces, where N is a positive integer greater than 1. The SIM card interface 595 may support a Nano SIM card, a Micro SIM card, a SIM card, and the like.

Figure 5B:
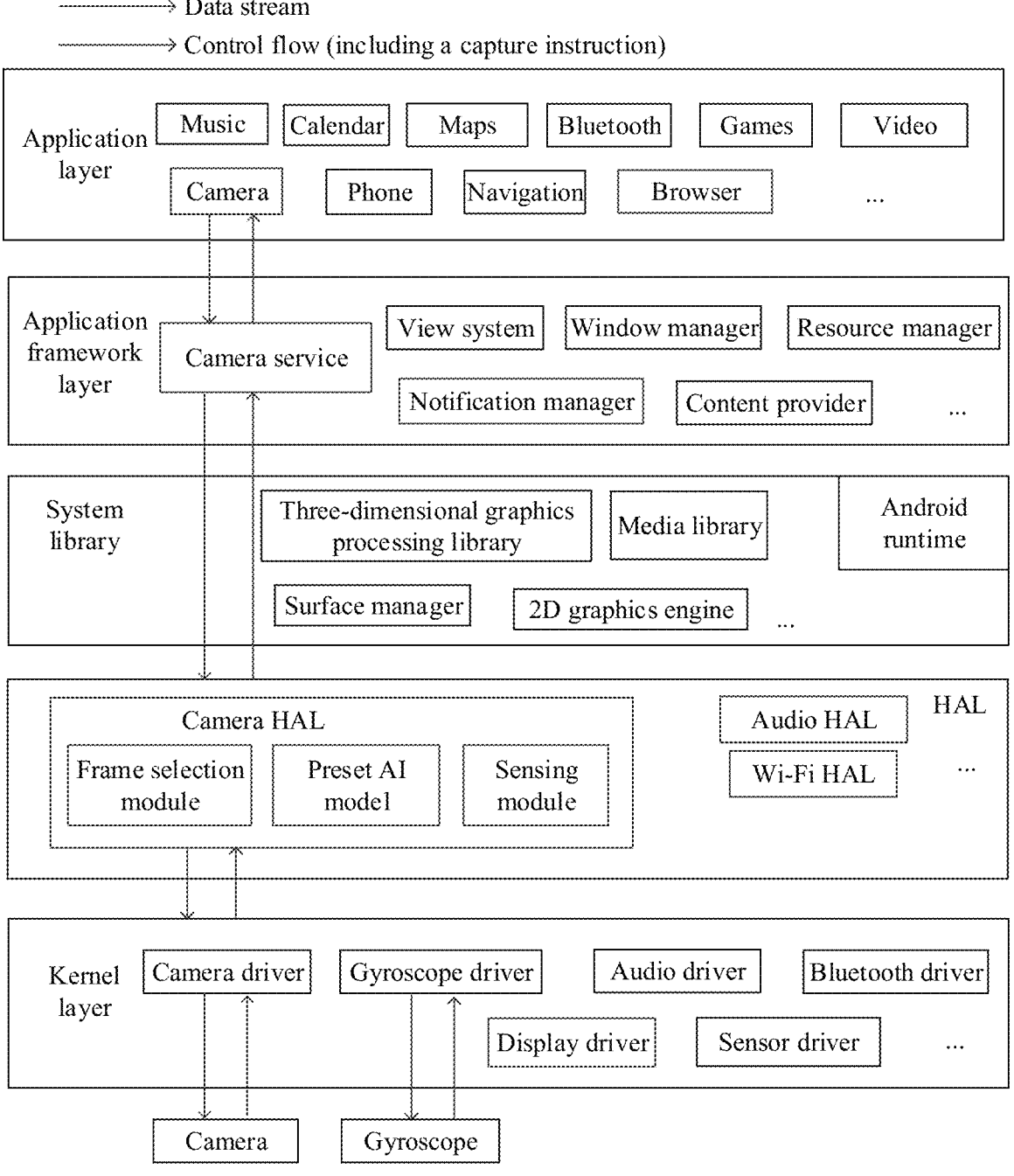
FIG. 5B is a schematic diagram of a software architecture of a mobile phone according to an embodiment of this application.

The method in the following embodiments may be implemented in the electronic device 500 having the foregoing hardware structure. In the following embodiments, an example in which the electronic device 500 is a mobile phone is used to describe the method in the embodiments of this application. FIG. 5B is a block diagram of a software structure of a mobile phone according to an embodiment of this application.

In a layered architecture, software is divided into several layers, and each layer has a clear role and task. The layers communicate with each other through software interfaces. In some embodiments, an Android™ system is divided into five layers: an application layer, an application framework layer, an Android runtime (Android runtime) and a system library, a hardware abstraction layer (hardware abstraction layer, HAL), and a kernel layer from top to bottom. It should be understood that the Android system is used as an example for description in this specification. In another operating system (for example, a Harmony™ system or an IOS™ system), the solutions of this application can also be implemented provided that functions implemented by functional modules are similar to those in the embodiments of this application.

The application layer may include a series of application packages.

As shown in FIG. 5B, applications such as Phone, Games, Camera, Navigation, Browser, Calendar, Maps, Bluetooth, Music, and Video may be installed at the application layer.

In this embodiment of this application, an application with a photographing function, for example, a camera application, may be installed at the application layer. Certainly, when another application needs to use the photographing function, the camera application may also be invoked to implement the photographing function.

The application framework layer provides an application programming interface (application programming interface, API) and a programming framework for an application at the application layer. The application framework layer includes some predefined functions.

For example, the application framework layer may include a window manager, a content provider, a view system, a resource manager, and a notification manager. This is not limited in this embodiment of this application.

For example, the window manager is used to manage a window program. The window manager may obtain a size of the display, determine whether there is a status bar, lock a screen, take a screenshot, and the like. The content provider is configured to store and obtain data, and enable the data to be accessed by an application. The data may include a video, an image, audio, calls that are made and answered, a browsing history and a bookmark, a phone book, and the like. The view system may be used to construct a display interface of an application. Each display interface may include one or more controls. Generally, the control may include interface elements such as an icon, a button, a menu, a tab, a text box, a dialog box, a status bar, a navigation bar, and a widget (Widget). The resource manager provides various resources for an application, such as a localized string, an icon, a picture, a layout file, and a video file. The notification manager enables an application to display notification information in a status bar, and may be configured to convey a notification-type message. The notification manager may automatically disappear after a short pause without requiring a user interaction. For example, the notification manager is configured to notify download completion, provide a message notification, and the like. The notification manager may be alternatively a notification that appears in the status bar at a top of a system in a form of a graph or scroll bar text, for example, a notification of an application running in the background, or a notification that appears on a screen in a form of a dialog window. For example, text information is prompted in the status bar, alert sound is played, the mobile phone vibrates, or an indicator light blinks.

As shown in FIG. 5B, the Android runtime includes a kernel library and a virtual machine. The Android runtime is responsible for scheduling and management of the Android system.

The kernel library includes two parts: One part is a functional function that needs to be invoked by a java language, and the other part is a kernel library of Android.

The application layer and the application framework layer are run in the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications. The media library supports playback and recording in a plurality of common audio and video formats, a still image file, and the like. The media library may support a plurality of audio and video encoding formats, such as MPEG4, H.254, MP3, AAC, AMR, JPG, and PNG. The three-dimensional graphics processing library is used to implement three-dimensional graphics drawing, image rendering, composition, layer processing, and the like. The 2D graphics engine is a drawing engine for 2D graphics drawing.

The kernel layer is a layer that is between hardware and software and that is located below the HAL. The kernel layer includes at least a display driver, a camera driver, an audio driver, a sensor driver, and the like. This is not limited in this embodiment of this application.

In this embodiment of this application, still as shown in FIG. 5B and using the camera application as an example, a camera service (Camera Service) may be disposed at the application framework layer. The camera application may enable the Camera Service by invoking a preset API. During running, the Camera Service may interact with a Camera HAL at the hardware abstraction layer (HAL). The camera HAL is responsible for interacting with a hardware device (for example, the camera) that implements the photographing function and that is in the mobile phone. In one aspect, the Camera HAL hides implementation details (for example, a specific image processing algorithm) of a related hardware device. In another aspect, the Camera HAL may provide an interface for invoking the related hardware device to the Android system.

For example, during running, the camera application may send, to the Camera Service, a related control command (for example, previewing, zooming in, photographing, video recording, or a capture instruction) delivered by a user. In one aspect, the Camera Service may send the received control command to the Camera HAL, so that the Camera HAL may invoke the camera driver at the kernel layer based on the received control command. The camera driver drives a hardware device such as the camera to collect image data in response to the control command. For example, the camera may transfer, at a specific frame rate, data of each collected frame of image to the Camera HAL by using the camera driver. For a transferring process of the control command in the operating system, refer to a detailed transferring process of a control stream in FIG. 5B.

In another aspect, after receiving the control command, the Camera Service may determine a photographing policy at this time according to the received control command, and a specific image processing task that needs to be executed on the collected image data is set in the photographing policy. For example, in a preview mode, the Camera Service may set an image processing task 1 in the photographing policy to implement a face detection function. For another example, if the user enables a facial beautification function in the preview mode, the Camera Service may further set an image processing task 2 in the photographing policy to implement the facial beautification function. Further, the Camera Service may send the determined photographing policy to the Camera HAL.

After receiving the data of each frame of image collected by the camera, the Camera HAL may execute a corresponding image processing task on the image data according to the photographing policy delivered by the Camera Service, to obtain each frame of photographed picture obtained after image processing. For example, the Camera HAL may execute the image processing task 1 on the received data of each frame of image according to a photographing policy 1, to obtain each corresponding frame of photographed picture. After the photographing policy 1 is updated to a photographing policy 2, the Camera HAL may execute the image processing task 2 on the received data of each frame of image according to the photographing policy 2, to obtain each corresponding frame of photographed picture.

Subsequently, the Camera HAL may report each frame of photographed picture obtained after the image processing to the camera application by using the Camera Service. The camera application may display each frame of photographed picture in the display interface, or the camera application saves each frame of photographed picture in a form of a photo or a video in the mobile phone. For a transferring process of the photographed picture in the operating system, refer to a detailed transferring process of a data stream in FIG. 5B.

A working principle for implementing the method in the embodiments of this application at each software layer in the mobile phone is described herein in the embodiments of this application with reference to FIG. 5B.

When running in a video recording mode, the camera application may send, to the Camera Service, a capture instruction delivered by the user. In the video recording mode, the Camera HAL may invoke the camera driver at the kernel layer according to a previously received video recording instruction. The camera driver drives a hardware device such as the camera to collect the image data in response to the video recording instruction. For example, the camera may transfer, at a specific frame rate, data of each collected frame of image to the Camera HAL by using the camera driver. A data stream that includes each frame of image transferred by the camera driver according to the video recording instruction to the Camera HAL may be the video stream (such as the preview stream and the video recording stream) described in the embodiments of this application.

In addition, after receiving the capture instruction, the Camera Service may determine, according to the received capture instruction, that a photographing policy 3 in this case is to capture an image in video recording. A specific image processing task 3 that needs to be executed on the collected image data is set in the photographing policy, the image processing task 3 includes cropping processing performed based on a cropping manner and a cropping parameter of a target preview image, and the image processing task 3 is used to implement a capturing function in a video. Further, the Camera Service may send the determined photographing policy 3 to the Camera HAL.

After receiving the data of each frame of image collected by the camera, the Camera HAL may execute the corresponding image processing task 3 on the image data according to the photographing policy 3 delivered by the Camera Service, for example, performing, based on the cropping manner and the cropping parameter of the target preview image, cropping processing on m frames of first images including a second image, to obtain a corresponding captured image.

It should be noted that, in this embodiment of this application, each frame of image (that is, the first image) that is exposed and output by an image sensor (Sensor) of the camera may be buffered in a first buffer queue (Buffer). The first buffer queue (Buffer) may be disposed at any layer of a software system of the mobile phone. For example, the first buffer queue (Buffer) may be disposed in a memory area that is accessed by the Camera HAL by using a software interface. In response to the capture instruction, the Camera HAL may select a captured frame from the Buffer based on metadata of a plurality of frames of Bayer images (that is, first images) buffered in the Buffer. In this way, the mobile phone may obtain a captured frame with relatively high image quality from the first buffer queue. For example, additional information of the first image may include contrast of the first image and an angular velocity at which the camera collects the first image. It should be understood that, a lower angular velocity indicates lower jitter existing when the camera collects the first image, and a higher angular velocity indicates higher jitter existing when the camera collects the first image. The contrast is used to represent definition of the first image. Higher contrast indicates a clearer first image. In this way, based on the additional information of the first image, a Bayer image with low jitter and maximum image definition may be selected, as the captured frame, from the plurality of frames of Bayer images (that is, the first images) buffered in the Buffer.

Additional information of each frame of Bayer image buffered in the Buffer may be obtained by assigning a value to the metadata (metadata) of each frame of Bayer image in the Buffer by an ISP of a camera at a hardware layer. The ISP may be divided into a statistics collecting module and a processing module based on functions. The statistics collecting module may include an (image front end, IFE), and the processing module may include an (image processing engine, IPE) and a (bayer processing segment, BPS). The additional information of the Bayer image may be obtained by the statistics collecting module of the ISP by assigning a value to the metadata of each frame of Bayer image in the Buffer. The processing module of the ISP is configured to process an image that is exposed and output by the Sensor.

The angular velocity may be collected by a gyroscope in the electronic device. In this embodiment of this application, the HAL stores software code used to schedule the gyroscope. In response to the video recording instruction, the Camera HAL may invoke a gyroscope driver at the kernel layer, and the gyroscope driver drives the gyroscope to collect an angular velocity of the electronic device. The angular velocity of the electronic device is an angular velocity of the camera. The camera may have different angular velocities at different moments, and the Sensor of the camera may expose and output different Bayer images at different moments. In addition, in response to the video recording instruction, the Camera HAL may further invoke the camera driver at the kernel layer, and the camera driver drives the statistics collecting module of the ISP in the camera to write the angular velocity collected by the gyroscope into the metadata of the Bayer image output by the Sensor.

The additional information of the Bayer image further includes time at which the Sensor exposes and outputs the Bayer image. The statistics collecting module of the ISP may determine an angular velocity of the Bayer image based on collection time of the angular velocity and the exposure time of the Bayer image, and write the angular velocity of the Bayer image into the metadata of the Bayer image. In addition, the statistics collecting module of the ISP may further analyze the Bayer image to obtain contrast of the Bayer image, and write the contrast of the Bayer image into the metadata of the Bayer image.

It should be noted that, on some platforms, exposure end time of the Sensor may be used as a timestamp, and on some other platforms, exposure start time of the sensor may be used as a timestamp. This is not limited in this embodiment of this application. The exposure end time and the exposure start time are collectively referred to as the exposure time.

The statistics collecting module of the ISP may write the angular velocity and the contrast of each Bayer image in the Buffer into metadata of a corresponding Bayer image by using a first preset interface, such as a first camera serial interface (camera serial interface, CSI). The first preset CSI may be a software interface between the Sensor and the Buffer.

The Camera HAL may further perform, by using a second preset interface (such as a second preset CSI), first image processing (including cropping processing) on the m frames of first images including the second image, to obtain a captured image. The second preset CSI may be a software interface between the Buffer and a module for performing the first image processing. Finally, the Camera HAL may report the captured image to the camera application by using the Camera Service, and the camera application may save the captured image in a form of a photo in the mobile phone.

The Camera HAL may further include a preset RAW domain image processing algorithm. The Camera HAL may invoke, by using a second preset interface (such as a second preset CSI), the preset RAW domain image processing algorithm to process the captured frame and a frame adjacent to the captured frame, to obtain a processed image frame. The second preset CSI may be a software interface between the Buffer and the preset RAW domain image processing algorithm. Then, the Camera HAL may encode the image frame by invoking an encoder (ENCODE), to obtain a frame of captured image. Similarly, the Camera HAL may report the captured image to the camera application by using the Camera Service, and the camera application may save the captured image in a form of a photo in the mobile phone.

In some embodiments, the Camera HAL further includes a sensing module. After the frame selection module selects the captured frame, the sensing module may determine, based on the captured frame and the frame adjacent to the captured frame, whether the mobile phone is in a high dynamic range (high dynamic range, HDR) scenario. Different image processing procedures are executed by the preset RAW domain image processing algorithm in the HDR scenario and a non-HDR scenario. For the image processing procedures executed by the preset RAW domain image processing algorithm in the HDR scenario and the non-HDR scenario, refer to detailed descriptions in the following embodiments. Details are not described herein again.

An embodiment of this application provides a method for capturing an image in video recording. The method may be applied to a mobile phone, and the mobile phone includes a camera. As shown in FIG. 6, the method may include S601-S605.

S601: The mobile phone receives a first operation of a user, where the first operation is used to trigger the mobile phone to start to record a video.

Figure 7:
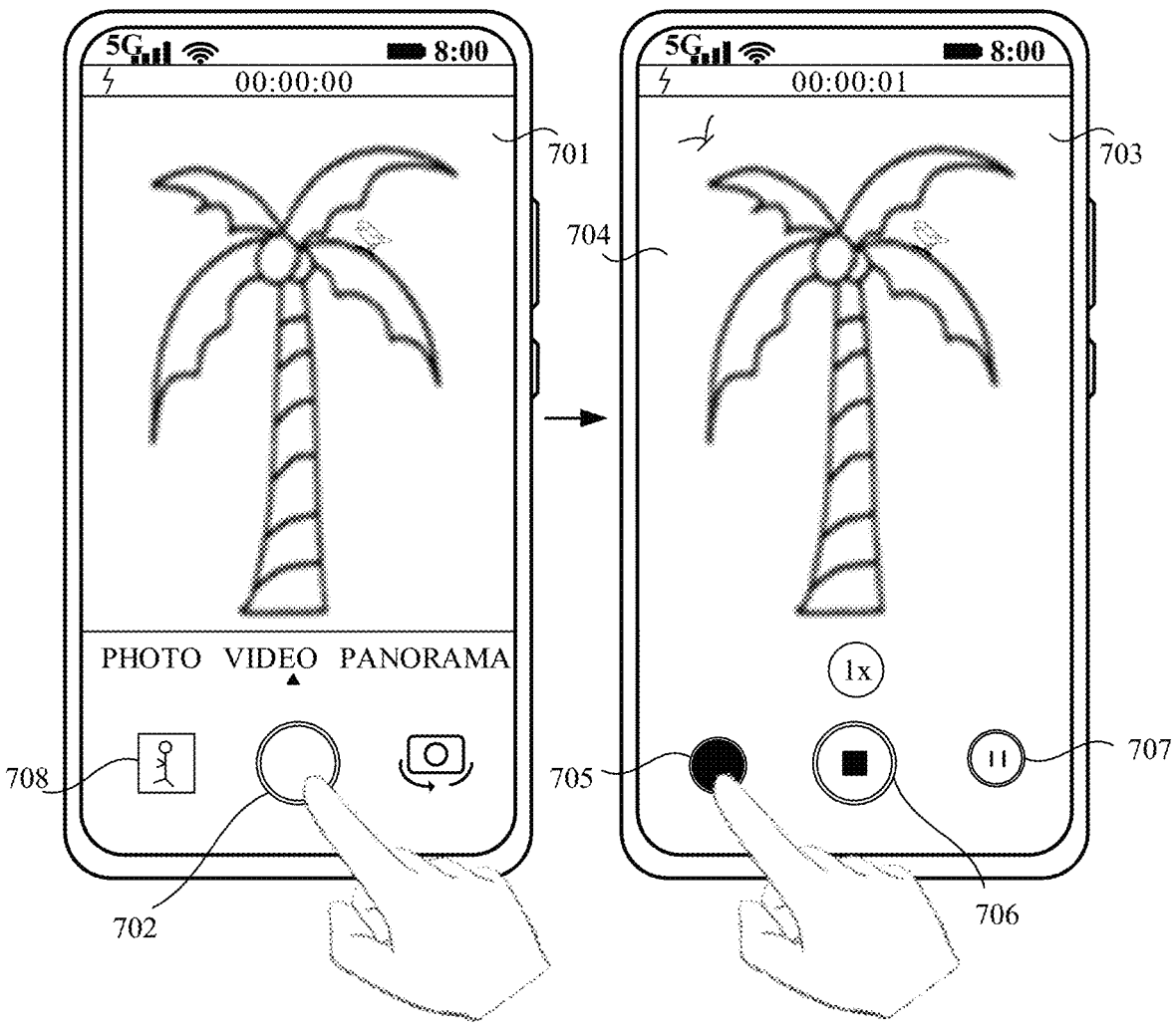
FIG. 7 is a schematic diagram of a display interface of a mobile phone according to an embodiment of this application.

For example, the mobile phone may display a viewfinder interface 701 for video recording shown in FIG. 7. The viewfinder interface 701 for video recording is a viewfinder interface displayed before the mobile phone starts video recording. The viewfinder interface 701 for video recording includes a "start video recording" button 702. The first operation may be a tap operation performed by the user on the "start video recording" button 702 to trigger the mobile phone to start to record a video.

S602: In response to the first operation, the camera of the mobile phone collects a first image, and the mobile phone displays a first interface. The first interface is a viewfinder interface in which the mobile phone is recording the video, a preview stream is displayed in the viewfinder interface, and the preview stream includes a preview image obtained based on the first image. The first interface further includes a snapshot shutter, and the snapshot shutter is configured to trigger the mobile phone to capture an image to obtain a photo.

For example, the first operation is the tap operation performed by the user on the "start video recording" button 702. The mobile phone responds to the tap operation performed by the user on the "start video recording" button 702, the camera of the mobile phone may start to collect an image (that is, the first image), and a display of the mobile phone may display a first interface 703 shown in FIG. 7. The first interface 703 is the viewfinder interface in which the mobile phone is recording the video. As shown in FIG. 7, the first interface 703 includes a preview image 704 obtained based on the first image. A plurality of frames of preview images 704 may form the preview stream shown in FIG. 1, FIG. 4A, FIG. 4C, or FIG. 4D.

A method used by the mobile phone to obtain the preview image 704 based on the first image is described herein in this embodiment of this application. In S602, after the camera of the mobile phone collects the first image, and before the mobile phone displays the first interface, the mobile phone may process the first image in a manner of processing the preview stream shown in FIG. 1, FIG. 4A, FIG. 4C, or FIG. 4D, to obtain the preview image 704. It should be noted that an ISP of the mobile phone may process, by using the ISP, each frame of first image collected by the camera.

For example, for the method used by the mobile phone to obtain the preview image 704 based on the first image, refer to a method for processing the "preview stream" shown in FIG. 4C or FIG. 4D.

As shown in FIG. 4C or FIG. 4D, an image sensor (Sensor) of the mobile phone may continuously output Bayer images under the control of exposure. After image processing is performed on each frame of Bayer image by the ISP of the mobile phone, an obtained image is sent to an encoder (ENCODER) 1 for encoding, to obtain the preview image 704. The plurality of frames of processed preview images 704 may form a segment of preview video stream (that is, the preview stream).

It should be emphasized that, as shown in FIG. 7, the first interface 703 further includes a snapshot shutter 702. The snapshot shutter 702 is configured to trigger the mobile phone to capture an image to obtain a photo. Specifically, the snapshot shutter 702 is configured to trigger the mobile phone to capture an image in a video recording process to obtain a photo. It may be figured out that, in a process of recording a video (that is, a video recording process), the mobile phone may collect some wonderful pictures. In the video recording process of the mobile phone, the user may expect the mobile phone to capture the wonderful pictures, save the wonderful pictures as photos, and display the photos to the user. In this embodiment of this application, the user taps the snapshot shutter 702 to implement a function of capturing the wonderful pictures in the video recording process.

To ensure that the mobile phone can capture, in response to a capture operation of the user (for example, a tap operation performed by the user on the snapshot shutter 702), an image that the user actually needs, the mobile phone may buffer, in a first buffer queue (Buffer), a Bayer image exposed and output by the Sensor. In this case, even if there is delay duration (for example, 120 ms-160 ms) shown in FIG. 3 from receiving the capture operation of the user to receiving a capture instruction by the Sensor, all frames output by the Sensor in the delay duration can be buffered in the Buffer. Therefore, when the mobile phone receives the capture operation of the user, the Bayer image output by the Sensor may also be buffered in the first buffer queue. In addition, image content of the frame output by the Sensor does not change significantly in a short time. Therefore, the mobile phone may select a frame of image with relatively good image quality from the Buffer as the captured image. Specifically, in response to the first operation, the mobile phone may further perform S603.

S603: The mobile phone buffers, in the first buffer queue, the first image collected by the camera, where n frames of first images collected by the camera are buffered in the first buffer queue, n≥1, and n is an integer.

Figure 8:
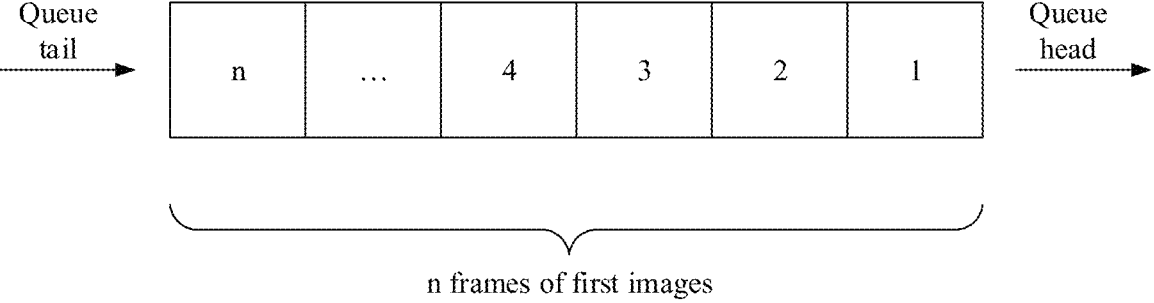
FIG. 8 is a schematic diagram of a first buffer queue according to an embodiment of this application.

For example, in response to the first operation, the mobile phone may buffer, in a first buffer queue (Buffer) shown in FIG. 8, the first image collected by the camera. It should be noted that the n frames of first images collected by the camera may be buffered in the first buffer queue according to a first in first out rule. As shown in FIG. 8, an enqueuing operation may be performed at a queue tail of the first buffer queue to insert the first image, and a dequeuing operation may be performed at a queue head of the first buffer queue to delete the first image. When the n frames of first images have been buffered in the first buffer queue, each time one frame of first image is inserted at the queue tail of the first buffer queue, one frame of first image is deleted at the queue head of the first buffer queue.

In some embodiments, n may be equal to 1. In this case, one frame of first image may be buffered in the first buffer queue. In this way, when the mobile phone performs S604-S605, an electronic device can perform first image processing on only one frame of first image (that is, a second image), to obtain the captured image.

In some other embodiments, n may be greater than 1. In this case, a plurality of frames of first images may be buffered in the first buffer queue. In this way, when the mobile phone performs S604-S605, an electronic device may perform image processing on one frame of first image to obtain the captured image, or may perform image processing on the plurality of frames of first images to obtain the captured image. When the electronic device performs image processing on the plurality of frames of first images to obtain the captured image, image quality of a captured frame (that is, a reference frame) can be improved, obtaining of information such as noise and texture is facilitated, and image quality of an output image can be further improved.

In this embodiment of this application, n may be a preset value. Assuming that the Sensor can expose a frames of Bayer images per second, and the delay duration shown in FIG. 3 is b, the Sensor may expose $b/(1/a)=a*b$ frames of Bayer images within the delay duration b. n may be greater than or equal to $a*b$.

S604: The mobile phone selects, based on additional information of the first image in response to a second operation performed by the user on the snapshot shutter, the second image from the n frames of first images buffered in the first buffer queue. The additional information of the first image includes at least one of contrast of the first image, an angular velocity at which the camera collects the first image, and a timestamp of the first image.

For example, the second operation may be a tap operation performed by the user on the snapshot shutter. For example, the second operation may be a tap operation performed by the user on the snapshot shutter shown in FIG. 7. Alternatively, the second operation may be a continuous-tap operation performed by the user on the snapshot shutter. Each tap operation on the snapshot shutter is used to trigger the mobile phone to perform the following operation once: "selecting, based on the additional information of the first image, the second image from the n frames of first images buffered in the first buffer queue" and S605. In other words, the tap operation on the snapshot shutter is used to trigger the mobile phone to capture one photo. The continuous-tap operation on the snapshot shutter is used to trigger the mobile phone to capture a plurality of photos. A method used by the mobile phone to capture the plurality of photos in the video recording process is similar to a method for capturing one photo. Details are not described herein again.

In this embodiment of this application, as shown in FIG. 5B, a Camera HAL at an HAL of the mobile phone may include a frame selection module. After the Camera HAL receives a capture instruction from a Camera Service, the frame selection module may select, based on the additional information of the first image, the second image (that is, the captured frame, which is also referred to as the reference frame) from the n frames of first images buffered in the first buffer queue (Buffer). The additional information of the first image includes at least one of the contrast of the first image, the angular velocity (referred to as an angular velocity of the first image for short) at which the camera collects the first image, and the timestamp of the first image.

The contrast may also be referred to as a gradient. A greater gradient of a frame of image indicates a clearer image. The gradient may also be referred to as sharpness. Greater sharpness of a frame of image indicates a clearer image. In other words, the contrast may be used to represent definition of the first image. Higher contrast of a frame of image (for example, the first image) indicates a clearer image.

The angular velocity may be collected by a gyroscope sensor. A value of an angular velocity of a frame of image (that is, the first image) may represent a size of an angular velocity at which the camera (for example, the Sensor of the camera) collects the image. A lower angular velocity indicates lower jitter existing when the camera collects the first image, and a higher angular velocity indicates higher jitter existing when the camera collects the first image.

In this way, the mobile phone (for example, the frame selection module at the HAL of the mobile phone) may select, as the captured frame (that is, the second image) based on the additional information of the first image, a Bayer image with low jitter and maximum image definition from the plurality of frames of Bayer images (that is, first images) buffered in the first buffer queue (Buffer). For example, the mobile phone (for example, the frame selection module at the HAL of the mobile phone) may traverse the n frames of first images buffered in the Buffer, and select, as the second image based on the additional information of the first image, a first image with low jitter and maximum image definition from the n frames of first images buffered in the Buffer.

In some embodiments, a method used by the mobile phone to select, based on the additional information of the first image, the second image from the n frames of first images buffered in the first buffer queue (Buffer) may include Sa. Sa: The mobile phone selects a first image with largest contrast from the n frames of first images buffered in the first buffer queue (Buffer).

In one case, in the n frames of first images buffered in the first buffer queue (Buffer), there is a frame of first image with largest contrast that is greater than contrast of another first image other than this frame of first image. In this case, the mobile phone may use the frame of first image with the largest contrast as the second image.

In another case, the n frames of first images buffered in the first buffer queue (Buffer) may include at least two frames of first images with same contrast. In addition, the contrast of the at least two frames of first images is greater than contrast of another first image in the n frames of first images. In this case, the mobile phone may further perform Sb. Sb: The mobile phone selects, as the second image, a first image with a lowest angular velocity from the at least two frames of first images.

It should be noted that metadata of the Bayer image (that is, the first image) exposed by the Sensor does not include the additional information. The additional information of the first image may be obtained by a statistics collecting module of the ISP by assigning a value to metadata of each frame of Bayer image in the first buffer queue (Buffer).

Then, the frame selection module in the mobile phone may select, based on the additional information of the first image, the second image from the n frames of first images buffered in the first buffer queue.

In some embodiments, each frame of first image includes a timestamp, and the timestamp records time (that is, exposure time) at which the image sensor Sensor outputs a corresponding first image. The timestamp may also be included in metadata of the first image.

A clock of an upper-layer application in the mobile phone is synchronized with a clock of the Sensor that records image output of the first image, or the clock of the upper-layer application in the mobile phone and the clock of the Sensor that records image output of the first image are a same system clock. Time at which the mobile phone receives the second operation (that is, the capture operation) may be recorded by an application layer of the mobile phone. In this case, on a premise that a system clock of the upper-layer application in the mobile phone is synchronized with a system clock of the Sensor, the mobile phone (for example, the statistics collecting module of the ISP) may select, as the angular velocity of the first image based on time at which the gyroscope sensor collects each angular velocity, an angular velocity whose collection time is closest to exposure time recorded by the timestamp of the first image. Then, the statistics collecting module of the ISP may write the angular velocity of the first image into the metadata of the first image.

It should be noted that, on some platforms, exposure end time of the Sensor may be used as a timestamp, and on some other platforms, exposure start time of the sensor may be used as a timestamp. This is not limited in this embodiment of this application. The exposure end time and the exposure start time are collectively referred to as the exposure time.

In some other embodiments, if the n frames of first images buffered in the first buffer queue (Buffer) have same additional information, the mobile phone (for example, the frame selection module at the HAL of the mobile phone) may select, as the captured frame (that is, the second image) based on the timestamp of the first image and from the n frames of first images buffered in the first buffer queue (Buffer), a frame of first image for which time indicated by a timestamp is closest to time at which the user triggers capturing.

In some other embodiments, before "selecting the second image from the n frames of first images buffered in the first buffer queue (Buffer)", the mobile phone (for example, the frame selection module at the HAL of the mobile phone) may perform abnormality determining on the first image, discard an abnormal frame (that is, an abnormal first image) in the Buffer, and select the second image from a normal first image in the Buffer.

The mobile phone (for example, the frame selection module at the HAL of the mobile phone) may compare exposure time of a frame of first image (denoted as an image frame a) with exposure time of a previous frame of first image (denoted as an image frame b) of the image frame a to determine whether the image frame a is abnormal. It should be understood that exposure time at which the Sensor exposes and outputs each frame of Bayer image usually does not change greatly. For example, exposure time of an adjacent image frame does not suddenly become extremely high, or exposure time of the adjacent image frame does not suddenly become extremely low. For example, a difference between exposure time of adjacent image frames usually does not exceed 10 milliseconds (ms), and a maximum difference does not exceed 20 ms. Therefore, if a difference between the exposure time of the image frame a and the exposure time of the image frame b is greater than a preset exposure threshold, it indicates that the image frame a is abnormal. The preset exposure threshold may be a value that is less than 20 ms and that is approximately 10 ms. For example, the preset exposure threshold may be 10 ms, 9 ms, 11 ms, or 8 ms.

For a method used by the mobile phone (for example, the frame selection module at the HAL of the mobile phone) to select the second image from the normal first image in the Buffer, refer to the method in the foregoing embodiments. Details are not described herein again in this embodiment of this application.

S605: The mobile phone performs first image processing on m frames of first images including the second image, to obtain the captured image. The first image processing includes reference processing performed based on a cropping manner and a cropping parameter of a target preview image. The target preview image is a frame of image that is in the foregoing preview stream and that is collected by the camera when the mobile phone receives the second operation, m≥1, and m is an integer.

In some embodiments, m may be equal to 1. In other words, the m frames of first images are the second image. In other words, the mobile phone performs the first image processing on the second image to obtain a captured image with relatively high image quality. However, because parameters such as data integrity and texture of one frame of image are limited, if the mobile phone performs the first image processing on only one frame of image, image quality of this frame of image cannot be effectively improved.

Based on this, in some other embodiments, m may be greater than 1. Specifically, the mobile phone may perform the first image processing on the second image and m−1 frames of first images. In other words, the first image processing may be performed on the m frames of first images including the second image that are in the n frames of first images. It should be understood that other images (that is, m−1 frames of first images) in the m frames of first images other than the second image may play a role of enhancing image quality for the captured frame (that is, the reference frame). This facilitates obtaining of information such as noise and texture, so that image quality of the captured image can be further improved.

In one case, the m frames of first images are m consecutive frames of images including the second image that are in the n frames of first images. In other words, the m frames of first images are m adjacent frames of first images including the second image. Image content of adjacent images has higher similarity. Therefore, obtaining the captured image by using the m consecutive frames of images is more conducive to improvement of the image quality of the captured image.

In another case, the m frames of first images include the second image and m−1 frames of first images that are in the n frames of first images and whose resolution is greater than a preset resolution threshold. Specifically, when resolution of a frame of first image is greater than the preset resolution threshold, it indicates that the resolution of the first image is relatively high, or this may be understood as that definition of the first image is relatively high. In this case, the mobile phone may determine that the first image is a frame of image included in the m frames of first images (specifically, m−1 frames of first images). In other words, the m−1 frames of first images are first images with relatively high resolution in the n frames of first images. Therefore, obtaining the captured image by using a first image with relatively high resolution is more conducive to improvement of the image quality of the captured image.

In another case, the m frames of first images include the second image and m−1 frames of first images that are in the n frames of first images and whose high dynamic range (high dynamic range, HDR) parameters meet a preset HDR condition. Specifically, when an HDR parameter of a frame of first image meets the preset HDR condition, it indicates that the first image has an extremely high brightness dynamic range and richer color, or this may be understood as that image quality of the first image is relatively high. In this case, the mobile phone may determine that the first image is a frame of image included in the m frames of first images (specifically, the m−1 frames of first images). In other words, the m−1 frames of first images are first images with relatively high image quality in the n frames of first images. Therefore, obtaining the captured image by using a first image with relatively high image quality is more conducive to improvement of the image quality of the captured image.

With reference to the descriptions in the foregoing embodiment, it should be understood that when m≥2, the first image processing in this embodiment of this application is an image processing process in which a plurality of frames are input and a single frame is output. The electronic device performs the first image processing on the m frames of first images including the second image, so that the image quality of the captured image can be improved, and the image quality of the captured image can be improved.

It may be understood that the first image processing is implemented by the electronic device in a software-based manner. When a process of performing the first image processing on the m frames of first images including the second image is implemented in the software-based manner, image processing efficiency can be improved, and power consumption of the mobile phone can be reduced.

In some embodiments, the cropping manner of the target preview image includes a central cropping manner, and the cropping parameter of the target preview image includes center point coordinates of a cropping area of the target preview image and cropping size information.

It should be understood that one frame of preview image and one frame of first image may be full-size (full size) images, and the mobile phone may perform cropping processing on the preview image and the first image based on a corresponding cropping manner and a corresponding cropping parameter.

In an optional technical solution, the cropping size information may be size information of a cropped area, or may be size information of a remaining area, where the remaining area is an image obtained after the cropping processing is performed on the first image. Optionally, the cropping size information includes width and height information.

It should be noted that, in this embodiment of this application, the mobile phone may process, in a time division multiplexing manner, the first image by using the ISP to obtain the preview image, and assign a value to the metadata of the first image by using the ISP (for example, the statistics collecting module of the ISP), and the ISP performs the first image processing on the m frames of first images including the second image. In other words, if the ISP (for example, the statistics collecting module of the ISP)

assigns a value to the metadata of the first image and the ISP performs the first image processing on the m frames of first images including the second image, processing, by the mobile phone, the first image by using the ISP to obtain the preview image is not affected. In other words, if the mobile phone processes the captured stream shown in FIG. 4C or FIG. 4D, processing the video stream (such as the preview stream and the video recording stream) by the mobile phone is not affected.

Optionally, the preset RAW domain image processing algorithm described in this embodiment of this application is a neural network model in which a plurality of frames are input and a single frame is output. The preset RAW domain image processing algorithm is a deep learning network for image quality enhancement in a RAW domain. In this solution, the preset RAW domain image processing algorithm can be used to improve the image quality of the captured image, and this helps improve the image quality of the captured image.

Figure 9:
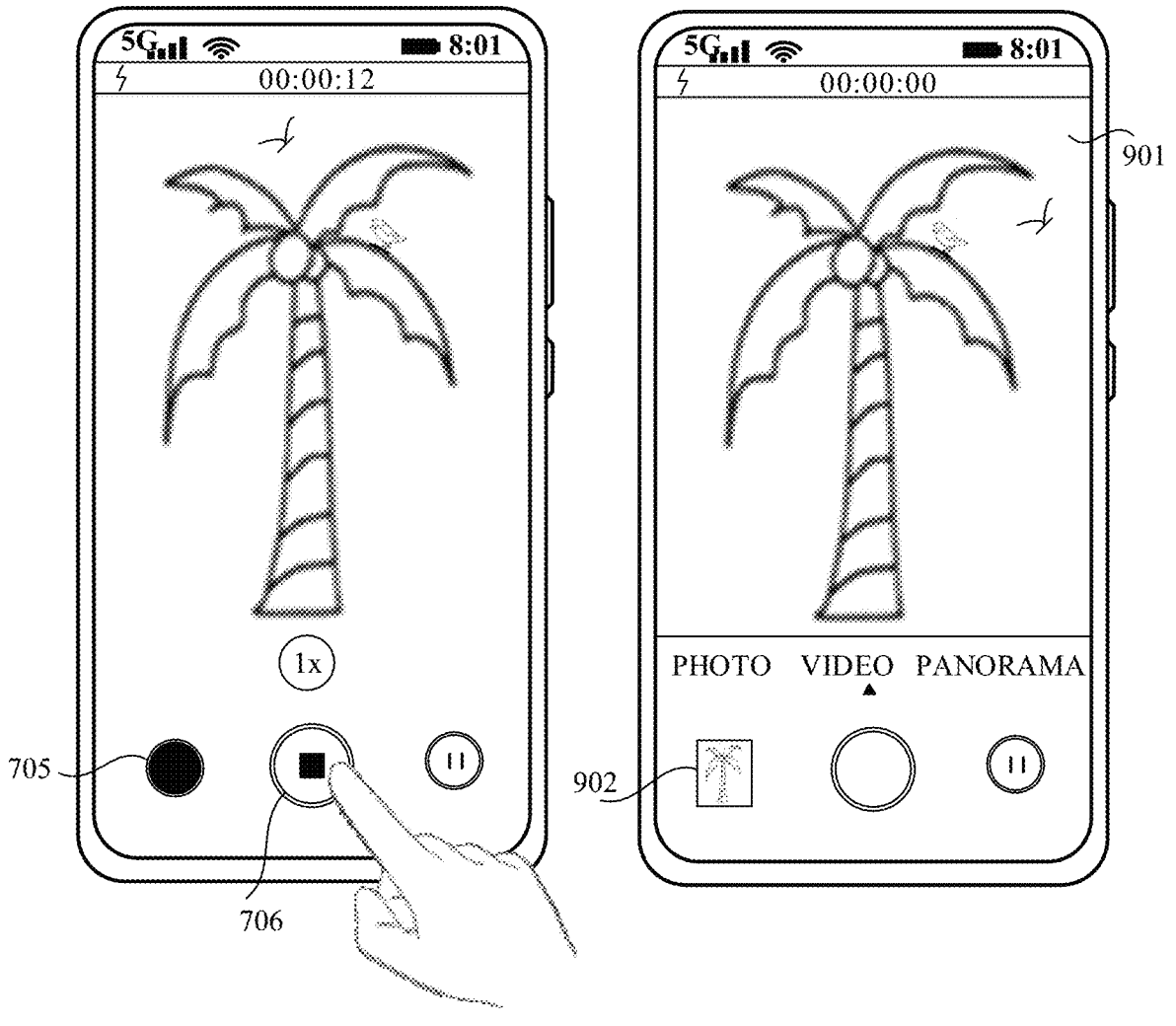
FIG. 9 is a schematic diagram of another display interface of a mobile phone according to an embodiment of this application.
Figure 10:
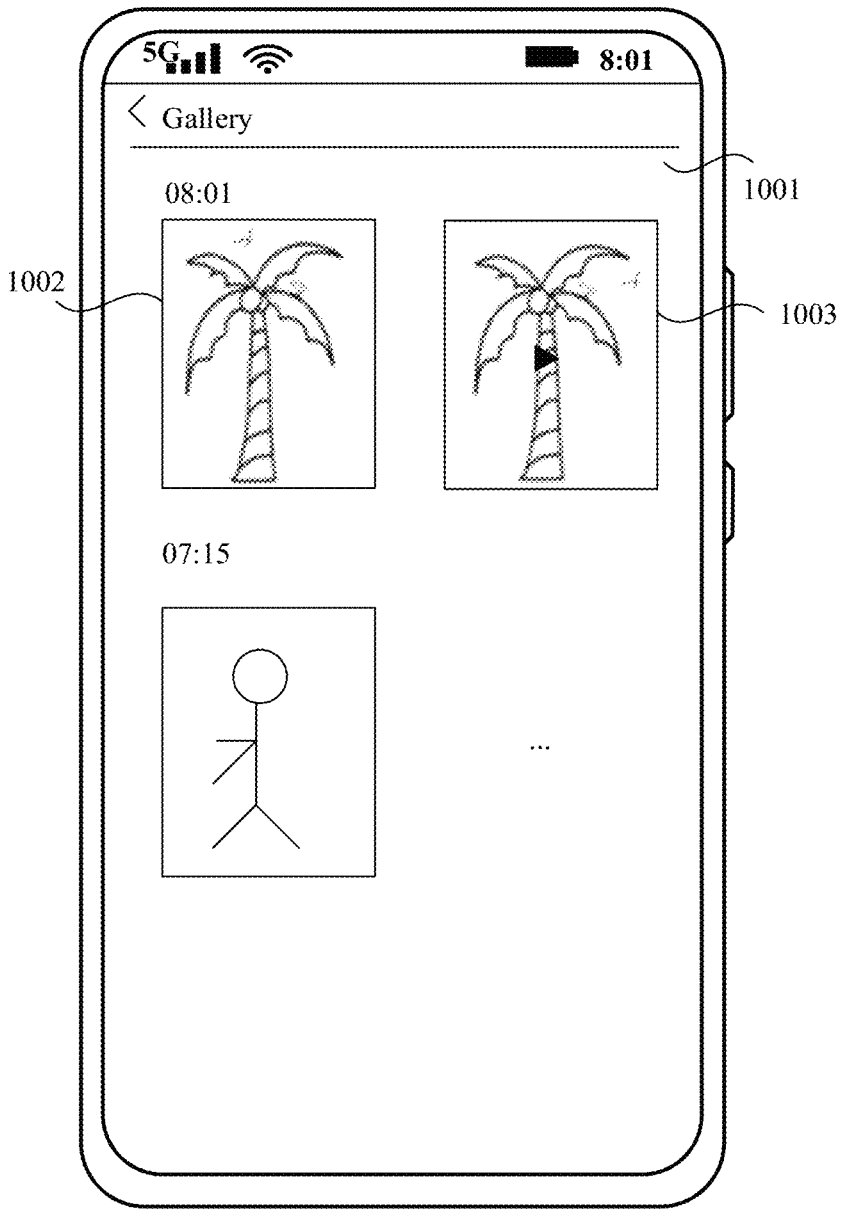
FIG. 10 is a schematic diagram of another display interface of a mobile phone according to an embodiment of this application.

For example, the mobile phone may generate and save a captured photo in response to the tap operation (that is, the second operation) performed by the user on the snapshot shutter shown in FIG. 7. However, in the video recording process of the mobile phone, the user cannot view the captured photo. After video recording ends, the user can view the captured photo in an album. For example, in response to a tap operation performed by the user on an "end video recording" button 706 shown in FIG. 9, the mobile phone may display a viewfinder interface 901 for video recording shown in FIG. 9. The viewfinder interface 901 for video recording is a viewfinder interface displayed before the mobile phone starts to record a video. In comparison with the viewfinder interface 701 for video recording shown in FIG. 7, a photo in a photo option in the viewfinder interface of the mobile phone is updated from 708 shown in FIG. 7 to 902 shown in FIG. 9. The mobile phone may display, in response to a start operation performed by the user on an album application, an album list interface 1001 shown in FIG. 10. The album list interface 1001 includes a plurality of photos and videos stored in the mobile phone. For example, as shown in FIG. 7, the album list interface 1001 includes a video 1003 recorded by the mobile phone and a photo 1002 captured by the mobile phone in a process of recording the video 1003.

In this embodiment of this application, the mobile phone may buffer, in the first buffer queue (Buffer), the Bayer image exposed and output by the Sensor. A plurality of frames of Bayer images may be buffered in the first buffer queue. In this case, even if there is the delay duration shown in FIG. 3 from receiving the capture operation of the user to receiving the capture instruction by the Sensor, all frames output by the Sensor in the delay duration can be buffered in the Buffer. Therefore, when the mobile phone receives the capture operation of the user, the Bayer image output by the Sensor may also be buffered in the first buffer queue. In addition, image content of the frame output by the Sensor does not change significantly in a short time. Therefore, the mobile phone may select a frame of image with relatively good image quality from the Buffer as the captured image.

In addition, the mobile phone may further perform the first image processing on the m frames of first images including the second image to obtain the captured image. The first image processing includes the cropping processing performed based on the cropping manner and the cropping parameter of the target preview image. Therefore, the mobile phone may perform, based on the cropping manner and the cropping parameter of the target preview image, the cropping processing on the m frames of first images including the second image, to obtain a captured image that is the same as the target preview image in terms of FOV, so that the image quality of the captured image can be improved.

In conclusion, according to the method in this embodiment of this application, an image that meets a user requirement can be captured in the video recording process, and the image quality of the captured image can be improved.

In an implementation of this embodiment of this application, m≥2. With reference to FIG. 6, as shown in FIG. 11, the mobile phone performs the first image processing on the m frames of first images including the second image to obtain the captured image (that is, S605), and this may specifically include S1101-S1103.

S1101: The mobile phone performs image fusion on the m frames of first images to obtain a third image.

Specifically, the mobile phone may perform the image fusion on a plurality of frames of first images based on a fusion algorithm. It should be understood that performing the image fusion on the m frames of first images can play a role of enhancing the image quality of the captured frame (that is, the reference frame), is conducive to obtaining of information such as noise and texture, and can further improve the image quality of the captured image.

S1102: The mobile phone performs the cropping processing on the third image based on the cropping manner and the cropping parameter of the target preview image to obtain a fourth image.

It may be understood that, that the mobile phone performs the image fusion on the m frames of first images to obtain the third image is a process of generating one frame of image based on a plurality of frames of images. In this way, the mobile phone needs to perform the cropping processing on only one frame of image (that is, the third image), so that image processing efficiency can be improved, and power consumption of the mobile phone can be reduced.

S1103: The mobile phone performs second image processing on the fourth image to obtain the captured image. The second image processing includes at least one of picture noise reduction, brightness and acceptance correction, and picture beautification processing.

It should be understood that the picture noise reduction (or picture denoising) is used to reduce noise in an image, so that definition of the image can be improved, and the image quality of the captured image can be improved. The brightness and acceptance correction is used to calibrate brightness and color of the image, and can also improve the image quality of the captured image. The mobile phone may perform the picture beautification processing on the image based on a skin beautification algorithm, so that aesthetic of the image can be improved, and a display effect of the captured image can be improved.

In this embodiment, the mobile phone may perform the image fusion on the m frames of first images to obtain the third image, and perform the cropping processing on the third image based on the cropping manner and the cropping parameter of the target preview image to obtain the fourth image. In other words, the electronic device fuses a plurality of frames of first images into one frame of image (that is, the third image), and needs to perform the cropping processing on only one frame of image, so that image processing efficiency can be improved, and power consumption of the mobile phone can be reduced.

In addition, the mobile phone may further perform processing processes such as picture noise reduction, brightness and acceptance correction, and picture beautification processing on the fourth image, so that the image quality and the display effect of the captured image can be improved.

For example, a specific process of obtaining the captured image in this embodiment of this application is described with reference to the foregoing process of obtaining the preview stream in FIG. 4A.

Figure 12:
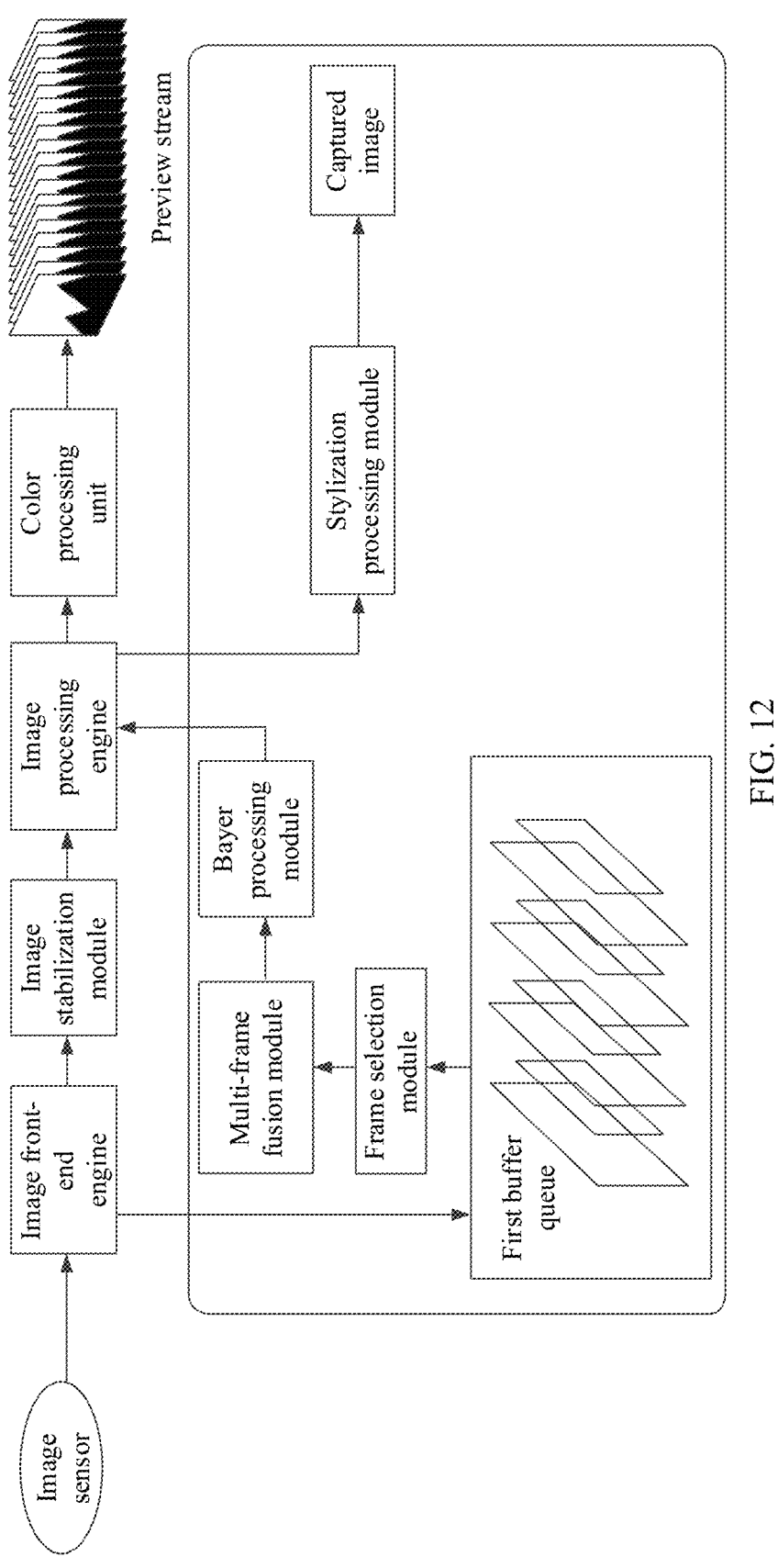
FIG. 12 is a block diagram of a principle of another method for capturing an image in video recording according to an embodiment of this application.

For example, as shown in FIG. 12, after each frame of Bayer image output by the image sensor (Sensor) of the mobile phone passes through an image front-end engine, a first buffer queue, a frame selection module, a multi-frame fusion module, a Bayer processing module, an image processing engine, and a stylization processing module of the mobile phone, the captured image can be obtained.

Specifically, the first buffer queue is used to buffer the first image collected by the camera. The frame selection module is configured to select the second image from the n frames of first images buffered in the first buffer queue. The multi-frame fusion module is configured to perform the image fusion on the m frames of first images to obtain the third image. The Bayer processing module is configured to perform the cropping processing on the third image based on the cropping manner and the cropping parameter of the target preview image to obtain the fourth image. The Bayer processing module is further configured to perform processing such as brightness and acceptance correction on the fourth image. The stylization processing module is configured to perform color processing, picture beautification processing, high dynamic processing, and the like on the fourth image.

It should be understood that the Bayer processing module may obtain the cropping manner and the cropping parameter of the target preview image from an image stabilization module.

With reference to FIG. 6, as shown in FIG. 13, before S605, the method provided in this embodiment of this application further includes S1301-S1302.

S1301: The mobile phone obtains a logical identifier of the target preview image. The logical identifier of the target preview image is used to identify a camera that collects the target preview image.

With reference to the descriptions in the foregoing embodiment, it should be understood that the mobile phone may include N cameras, where N is a positive integer greater than 1. The mobile phone may collect the first image by using a plurality of cameras.

S1302: The mobile phone determines, based on the logical identifier of the target preview image, the m frames of first images including the second image from the n frames of first images. A logical identifier of the m frames of first images is the same as the logical identifier of the target preview image.

In one case, one logical identifier corresponds to one camera. That the logical identifier of the m frames of first images is the same as the logical identifier of the target preview image indicates that a camera collecting the m frames of first images is the same as the camera collecting the target preview image. In this case, the mobile phone may determine, as a frame of image in the m frames of first images, a frame of first image in the n frames of first images that is collected by the camera that is the same as the camera collecting the target preview image. The m frames of first images can be conveniently and quickly determined from the n frames of first images, so that efficiency of generating the captured image can be improved.

In another case, one logical identifier may correspond to a plurality of cameras; or this may be understood as that one logical identifier corresponds to one camera set, and the camera set includes a plurality of cameras. That the logical identifier of the m frames of first images is the same as the logical identifier of the target preview image indicates that a camera collecting the m frames of first images and the camera collecting the target preview image belong to a same camera set. In this case, the mobile phone may determine, as a frame of image in the m frames of first images, a frame of first image collected by each of a plurality of cameras included in the same camera set. A large quantity of first images on which the first image processing is to be performed may be determined, so that the image quality of the captured image can be improved.

In an implementation of the instance in this application, the mobile phone may further collect current temperature of the mobile phone. If the current temperature of the mobile phone is greater than a preset temperature threshold, the m frames of first images include only the second image. If the current temperature of the mobile phone is less than or equal to the preset temperature threshold, m≥2.

It should be understood that, if the current temperature of the mobile phone is greater than the preset temperature threshold, it indicates that the current temperature of the mobile phone is relatively high, and continuing to run with high load may affect performance of the mobile phone. In this case, a thermal escape mechanism may be enabled for the mobile phone. Specifically, only one frame of image (that is, the second image) is used when the first image processing is performed, so that running load of the mobile phone can be reduced, and power consumption of the mobile phone can be reduced.

If the current temperature of the mobile phone is less than or equal to the preset temperature threshold, it indicates that the current temperature of the mobile phone is not very high. In this case, the mobile phone may obtain the captured image based on a plurality of frames of first images, so that the image quality of the captured image can be improved.

Some other embodiments of this application provide an electronic device, and the electronic device may include the foregoing display, a camera, a memory, and one or more processors. The display, the camera, and the memory are coupled to the processor. The memory is configured to store computer program code, and the computer program code includes computer instructions. When the processor executes the computer instructions, the electronic device may perform the functions or steps performed by the mobile phone in the foregoing method embodiments. For a structure of the electronic device, refer to the structure of the electronic device shown in FIG. 5A.

Figure 14:
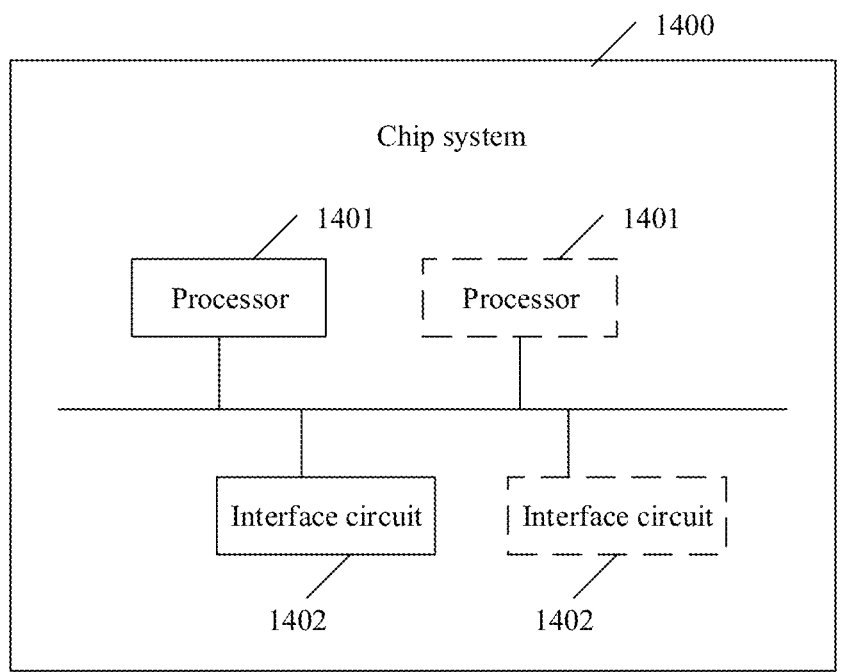
FIG. 14 is a schematic diagram of a structure of a chip system according to an embodiment of this application.

An embodiment of this application further provides a chip system. As shown in FIG. 14, the chip system 1400 includes at least one processor 1401 and at least one interface circuit 1402. The processor 1401 and the interface circuit 1402 may be connected to each other by using a line. For example, the interface circuit 1402 may be configured to receive a signal from another apparatus (such as a memory of an electronic device). For another example, the interface circuit 1402 may be configured to send a signal to another apparatus (for example, the processor 1401). For example, the interface circuit 1402 may read instructions stored in the memory, and send the instructions to the processor 1401. When the instructions are executed by the processor 1401, the electronic device may be enabled to perform the steps in the foregoing embodiments. Certainly, the chip system may further include another discrete component. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or steps performed by the mobile phone in the foregoing method embodiments.

An embodiment of this application further provides a computer program product. When the computer program product runs on a computer, the computer is enabled to perform the functions or steps performed by the mobile phone in the foregoing method embodiments.

It may be clearly learned by a person skilled in the art from the foregoing descriptions of the implementations that, for convenience and brevity of description, division into the foregoing functional modules is merely used as an example for description. In actual application, the foregoing functions may be allocated to different functional modules for implementation according to a requirement, that is, an internal structure of an apparatus is divided into different functional modules, to complete all or some of the functions described above.

In the several embodiments provided in this application, it should be understood that the disclosed apparatus and method may be implemented in another manner. For example, the apparatus embodiments described above are merely examples. For example, division into modules or units is merely logical function division. In actual implementation, there may be another division manner. For example, a plurality of units or components may be combined or integrated into another apparatus, or some features may be ignored or not performed. In addition, the displayed or discussed mutual couplings, direct couplings, or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, the functional units in the embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, the part contributing to the conventional technology, or all or some of the technical solutions may be implemented in a form of a software product. The software product is stored in a storage medium and includes several instructions for enabling a device (which may be a single-chip microcomputer, a chip, or the like) or a processor (processor) to perform all or some of the steps of the methods described in the embodiments of this application. The foregoing storage medium includes various media that can store program code, for example, a USB flash drive, a removable hard disk, a read only memory (read only memory, ROM), a random access memory (random access memory, RAM), a magnetic disk, or an optical disc.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

The invention claimed is:

1. A method for capturing an image in video recording, applied to an electronic device, wherein the method comprises:

receiving, by the electronic device, a first operation of a user, wherein the first operation is used to trigger the electronic device to start to record a video;

collecting, by a camera of the electronic device, a first image in response to the first operation, and displaying, by the electronic device, a first interface, wherein the first interface is a viewfinder interface in which the electronic device is recording the video, a preview stream is displayed in the viewfinder interface, the preview stream comprises a preview image obtained based on the first image, the first interface further comprises a snapshot shutter, and the snapshot shutter is configured to trigger the electronic device to capture an image to obtain a photo;

buffering, by the electronic device in a first buffer queue, the first image collected by the camera, wherein n frames of first images collected by the camera are buffered in the first buffer queue, $n \geq 1$, and n is an integer;

selecting, by the electronic device based on additional information of the first image in response to a second operation performed by the user on the snapshot shutter, a second image from the n frames of first images buffered in the first buffer queue, wherein the additional information of the first image comprises at least one of a contrast of the first image, an angular velocity at which the camera collects the first image, or a timestamp of the first image; and performing, by the electronic device, first image processing on m frames of first images comprising the second image, to obtain a captured image, wherein the first image processing comprises cropping processing performed based on a cropping manner and a cropping parameter of a target preview image, the target preview image is a frame of image that is in the preview stream and that is collected by the camera when the electronic device receives the second operation, $m \geq 1$, and m is an integer, wherein the cropping parameter of the target preview image comprises center point coordinates of a cropping area of the target preview image and cropping size information and wherein the first image processing further comprises:

collecting current temperature of the electronic device, in response to the current temperature of the electronic device being greater than a preset temperature threshold, performing the first image processing on only the second image to obtain a third image, in response to the current temperature of the electronic device being less than or equal to the preset temperature threshold, performing image fusion on a plurality of the m frames of first images to obtain the third image, and determining the captured image based on the third image.

2. The method according to claim 1, wherein the cropping manner of the target preview image comprises a center cropping manner.

3. The method according to claim 1, wherein determining the captured image based on the third image comprises performing, by the electronic device, cropping processing on the third image based on the cropping manner and the cropping parameter of the target preview image to obtain a fourth image; and performing, by the electronic device, second image processing on the fourth image to obtain the captured image, wherein the second image processing comprises at least one of picture noise reduction, brightness and color correction, and picture beautification processing.

4. The method according to claim 3, wherein the method further comprises:

obtaining, by the electronic device, a logical identifier of the target preview image, wherein the logical identifier of the target preview image is used to identify a camera that collects the target preview image; and determining, by the electronic device from the n frames of first images based on the logical identifier of the target preview image, the m frames of first images comprising the second image; wherein a logical identifier of the m frames of first images is the same as the logical identifier of the target preview image.

5. The method according to claim 3, wherein the m frames of first images are m consecutive frames of images comprising the second image that are in the n frames of first images; or the m frames of first images comprise the second image and m−1 frames of first images that are in the n frames of first images and whose resolution is greater than a preset resolution threshold; or the m frames of first images comprise the second image and m−1 frames of first images that are in the n frames of first images and whose high dynamic range (HDR) parameters meet a preset HDR condition.

6. The method according to claim 3, wherein in response to the current temperature of the electronic device being greater than the preset temperature threshold, the m frames of first images comprise only the second image, and m=1; or in response to if the current temperature of the electronic device being less than or equal to the preset temperature threshold, m≥2.

7. The method according to claim 1, wherein the additional information of the first image comprises the contrast of the first image, and the contrast of the first image is used to represent definition of the first image; and the second image is a first image with a highest contrast in the n frames of first images buffered in the first buffer queue.

8. The method according to claim 1, wherein the additional information of the first image comprises the angular velocity at which the camera collects the first image, and the angular velocity is used to represent a jitter situation existing when the camera collects the first image; and the second image is a first image with a minimum angular velocity in the n frames of first images buffered in the first buffer queue.

9. The method according to claim 1, wherein the additional information of the first image further comprises the timestamp of the first image, each frame of first image comprises a timestamp, and the timestamp records time at which an image sensor of the electronic device outputs a corresponding first image;

a clock of an upper-layer application in the electronic device is synchronized with a clock used by the image sensor to record image output of the first image, or the clock of the upper-layer application in the electronic device and the clock used by the image sensor to record image output of the first image are a same system clock; and the second image is a first image that is in the n frames of first images buffered in the first buffer queue and whose time recorded by a timestamp is closest to time at which the electronic device receives the second operation.

10. An electronic device, comprising:

a touchscreen, a memory, a camera, a display, a temperature sensor, and a processors, wherein the touchscreen, the memory, the camera, and the display are coupled to the processor, the memory stores computer program code, the computer program code comprises computer instructions, and when the computer instructions are executed by the processor, the electronic device is enabled to perform a method, the method comprising:

receiving a first operation of a user, wherein the first operation is used to trigger the electronic device to start to record a video;

collecting, with the camera, a first image in response to the first operation, and displaying a first interface, wherein the first interface is a viewfinder interface in which the electronic device is recording the video, a preview stream is displayed in the viewfinder interface, the preview stream comprises a preview image obtained based on the first image, the first interface further comprises a snapshot shutter, and the snapshot shutter is configured to trigger the electronic device to capture an image to obtain a photo;

buffering, in a first buffer queue, the first image collected by the camera, wherein n frames of first images collected by the camera are buffered in the first buffer queue, n≥1, and n is an integer;

selecting, based on additional information of the first image in response to a second operation performed by the user on the snapshot shutter, a second image from the n frames of first images buffered in the first buffer queue, wherein the additional information of the first image comprises at least one of contrast of the first image, an angular velocity at which the camera collects the first image, or a timestamp of the first image; and performing first image processing on m frames of first images comprising the second image, to obtain a captured image, wherein the first image processing comprises cropping processing performed based on a cropping manner and a cropping parameter of a target preview image, the target preview image is a frame of image that is in the preview stream and that is collected by the camera when the electronic device receives the second operation, m≥1, and m is an integer, wherein the cropping parameter of the target preview image comprises center point coordinates of a cropping area of the target preview image and cropping size information and wherein the first image processing further comprises:

collecting current temperature of the electronic device, in response to the current temperature of the electronic device being greater than a preset temperature threshold, performing the first image processing on only the second image to obtain a third image, in response to the current temperature of the electronic device being less than or equal to the preset temperature threshold, performing image fusion on a plurality of the m frames of first images to obtain the third image, and determining the captured image based on the third image.

11. The electronic device according to claim 10, wherein the cropping manner of the target preview image comprises a center cropping manner.

12. The electronic device according to claim 10, wherein to determine the captured image based on the third image comprises to:

perform cropping processing on the third image based on the cropping manner and the cropping parameter of the target preview image to obtain a fourth image; and perform second image processing on the fourth image to obtain the captured image, wherein the second image processing comprises at least one of picture noise reduction, brightness and color correction, and picture beautification processing.

13. The electronic device according to claim 12, wherein the electronic device is further to:

obtain a logical identifier of the target preview image, wherein the logical identifier of the target preview image is used to identify a camera that collects the target preview image; and determine, from the n frames of first images based on the logical identifier of the target preview image, the m frames of first images comprising the second image; wherein a logical identifier of the m frames of first images is the same as the logical identifier of the target preview image.

14. The electronic device according to claim 12, wherein the m frames of first images are m consecutive frames of images comprising the second image that are in the n frames of first images; or the m frames of first images comprise the second image and m−1 frames of first images that are in the n frames of first images and whose resolution is greater than a preset resolution threshold; or the m frames of first images comprise the second image and m−1 frames of first images that are in the n frames of first images and whose high dynamic range, HDR parameters meet a preset HDR condition.

15. The electronic device according to claim 12, wherein in response to the current temperature of the electronic device being greater than the preset temperature threshold, the m frames of first images comprise only the second image, and m=1; or in response to the current temperature of the electronic device being less than or equal to the preset temperature threshold, m≥2.

16. The electronic device according to claim 10, wherein the additional information of the first image comprises the contrast of the first image, and the contrast of the first image is used to represent definition of the first image; and the second image is a first image with highest contrast in the n frames of first images buffered in the first buffer queue.

17. The electronic device according to claim 10, wherein the additional information of the first image comprises the angular velocity at which the camera collects the first image, and the angular velocity is used to represent a jitter situation existing when the camera collects the first image; and the second image is a first image with a minimum angular velocity in the n frames of first images buffered in the first buffer queue.

18. The electronic device according to claim 10, wherein the additional information of the first image further comprises the timestamp of the first image, each frame of first image comprises a timestamp, and the timestamp records time at which an image sensor of the electronic device outputs a corresponding first image;

a clock of an upper-layer application in the electronic device is synchronized with a clock used by the image sensor to record image output of the first image, or the clock of the upper-layer application in the electronic device and the clock used by the image sensor to record image output of the first image are a same system clock; and the second image is a first image that is in the n frames of first images buffered in the first buffer queue and whose time recorded by a timestamp is closest to time at which the electronic device receives the second operation.

19. A non-transitory computer-readable storage medium, comprising computer instructions, wherein when the computer instructions are run on an electronic device, the electronic device is enabled to:

receive a first operation of a user, wherein the first operation is used to trigger the electronic device to start to record a video;

collect, with a camera, a first image in response to the first operation, and displaying a first interface, wherein the first interface is a viewfinder interface in which the electronic device is recording the video, a preview stream is displayed in the viewfinder interface, the preview stream comprises a preview image obtained based on the first image, the first interface further comprises a snapshot shutter, and the snapshot shutter is configured to trigger the electronic device to capture an image to obtain a photo;

buffer, in a first buffer queue, the first image collected by the camera, wherein n frames of first images collected by the camera are buffered in the first buffer queue, n≥1, and n is an integer;

select, based on additional information of the first image in response to a second operation performed by the user on the snapshot shutter, a second image from the n frames of first images buffered in the first buffer queue, wherein the additional information of the first image comprises at least one of a contrast of the first image, an angular velocity at which the camera collects the first image, or a timestamp of the first image; and perform first image processing on m frames of first images comprising the second image, to obtain a captured image, wherein the first image processing comprises cropping processing performed based on a cropping manner and a cropping parameter of a target preview image, the target preview image is a frame of image that is in the preview stream and that is collected by the camera when the electronic device receives the second operation, m≥1, and m is an integer, wherein the cropping parameter of the target preview image comprises center point coordinates of a cropping area of the target preview image and cropping size information and wherein the first image processing further comprises to:

collect current temperature of the electronic device, in response to the current temperature of the electronic device being greater than a preset temperature threshold, perform the first image processing on only the second image to obtain a third image, in response to the current temperature of the electronic device being less than or equal to the preset temperature threshold, perform image fusion on a plurality of the m frames of the first images to obtain the third image, and determine the captured image based on the third image.

20. The computer-readable storage medium according to claim 19, wherein the cropping manner of the target preview image comprises a center cropping manner.

* * * * *